(12) United States Patent (10) Patent No.: US 10,771,751 B2
Hiranuma (45) Date of Patent: Sep. 8, 2020

(54) PROJECTION IMAGE ADJUSTMENT SYSTEM AND PROJECTION IMAGE ADJUSTMENT METHOD

(71) Applicant: Panasonic Intellectual Property Management Co., Ltd., Osaka (JP)

(72) Inventor: Yoshinao Hiranuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/411,864

(22) Filed: Jan. 20, 2017

(65) Prior Publication Data

US 2017/0223320 A1 Aug. 3, 2017

(30) Foreign Application Priority Data

Feb. 2, 2016 (JP) .................................. 2016-017600
Dec. 12, 2016 (JP) .................................. 2016-239972

(51) Int. Cl.
*H04N 9/28* (2006.01)
*H04N 9/31* (2006.01)
*H04N 7/18* (2006.01)

(52) U.S. Cl.
CPC ........... *H04N 9/3185* (2013.01); *H04N 7/181* (2013.01); *H04N 9/3147* (2013.01)

(58) Field of Classification Search
CPC ...................................................... H04N 9/28
(Continued)

(56) References Cited

U.S. PATENT DOCUMENTS

2009/0002637 A1 1/2009 Harada
2010/0026972 A1* 2/2010 Kaneko ................... G03B 3/00
353/101
(Continued)

FOREIGN PATENT DOCUMENTS

CN 101019423 A 8/2007
CN 103259996 A 8/2013
(Continued)

OTHER PUBLICATIONS

English Translation of Chinese Search Report dated May 15, 2020 for the related Chinese Patent Application No. 201710052176.5.

*Primary Examiner* — Jefferey F Harold
*Assistant Examiner* — Sihar A Karwan
(74) *Attorney, Agent, or Firm* — McDermott Will & Emery LLP

(57) ABSTRACT

The projection image adjustment system includes: projection display apparatuses for projecting projection images; a first and a second imaging apparatus for shooting the projection images; and a controller. The controller includes: an imaging-apparatus selecting unit, a shooting-region setting unit, a pattern projection unit, and a shot-image display unit. The imaging-apparatus selecting unit selects the first or the second imaging apparatus. The shooting-region setting unit sets a first and a second charge-of-shoot region for a projection display apparatus. The first and the second imaging apparatus are respectively in charge of shooting the first and the second charge-of-shoot region. At least one projection display apparatus is shared by the first and second charge-of-shoot regions. The pattern projection unit projects a format pattern of the projection display apparatus corresponding to the first or the second charge-of-shoot region. The shot-image display unit displays an image of the first or the second imaging apparatus.

11 Claims, 24 Drawing Sheets

(58) Field of Classification Search
USPC .......................................................... 348/745
See application file for complete search history.

(56) References Cited

U.S. PATENT DOCUMENTS

| | | | | |
|---|---|---|---|---|
| 2011/0309999 | A1* | 12/2011 | Chang | G03B 21/13 345/1.1 |
| 2013/0215138 | A1* | 8/2013 | Suzuki | G06T 11/001 345/593 |
| 2015/0138240 | A1* | 5/2015 | Hiranuma | H04N 9/3185 345/634 |
| 2017/0142381 | A1* | 5/2017 | Kaji | G06T 7/70 |

FOREIGN PATENT DOCUMENTS

| | | |
|---|---|---|
| JP | 2000-350230 | 12/2000 |
| JP | 2013-118596 | 6/2013 |
| WO | 2006/030501 | 3/2006 |

* cited by examiner

FIG. 9

| Temporary ID | Row | Column | Layer | IP Address | Projector Name | Model |
|---|---|---|---|---|---|---|
| 1 | | | | 192.168.0.1 | Name4470 | DZ21K |
| 2 | | | | 192.168.0.2 | Name1116 | DZ21K |
| 3 | | | | 192.168.0.3 | Name0824 | DZ21K |
| 4 | | | | 192.168.0.4 | Name0116 | DZ21K |
| 5 | | | | 192.168.0.5 | Name1337 | DZ21K |

FIG. 11

Auto Screen Adjustment — 1200

Projector Layout | Camera Setting | Projection Setting

1. Find the projected number on the screen.
2. Click the location of the projected number on the layout chart below.
3. Locate every projected number until all of them are placed correctly on the layout chart.

| 1 | NAME4470 |
| 2 | NAME1116 |
| 3 | NAME0824 |
| 4 | NAME0116 |
| 5 | NAME1337 |

1201

Identify | Reset | Undo

Height: 1   Width: 5   Stack: 1

Click Next to continue.

Back | Next — 1202

FIG. 13

Auto Screen Adjustment — 1200

Projector Layout → Camera Setting → Projection Setting

1. Find the projected number on the screen.
2. Click the location of the projected number on the layout chart below.
3. Locate every projected number until all of them are placed correctly on the layout chart.

1201

| 3 | 1 | 4 | 2 | 5 |

Height: 1   Width: 5   Stack: 1

| 1 | NAME4470 |
| 2 | NAME1116 |
| 3 | NAME0824 |
| 4 | NAME0116 |
| 5 | NAME1337 |

Undo   Reset   Identify

Click Next to continue.

Back   Next — 1202

FIG. 14

| Temporary ID | Row | Column | Layer | IP Address | Projector Name | Model |
|---|---|---|---|---|---|---|
| 1 | 1 | 2 | 1 | 192.168.0.1 | Name4470 | DZ21K |
| 2 | 1 | 4 | 1 | 192.168.0.2 | Name1116 | DZ21K |
| 3 | 1 | 1 | 1 | 192.168.0.3 | Name0824 | DZ21K |
| 4 | 1 | 3 | 1 | 192.168.0.4 | Name0116 | DZ21K |
| 5 | 1 | 5 | 1 | 192.168.0.5 | Name1337 | DZ21K |

FIG. 20

| Camera ID | Device ID | Model | Start Index | End Index |
|-----------|-----------|---------|-------------|-----------|
| Camera2 | 00001143 | DMC-GX8 | 1 | 3 |
| Camera1 | 00001032 | DMC-GX8 | 3 | 5 |
| | | | | |
| | | | | |
| | | | | |

PROJECTION IMAGE ADJUSTMENT SYSTEM AND PROJECTION IMAGE ADJUSTMENT METHOD

BACKGROUND

Technical Field

The present disclosure relates to projection image adjustment systems and projection image adjustment methods. Each of the projection image adjustment systems is used to adjust a projection-image display region to have a desired shape or characteristics, through use of a plurality of imaging apparatuses, with the display region being formed by a plurality of projection display apparatuses. Such an adjustment is performed by each of the projection image adjustment methods.

Description of the Related Art

Patent Literature 1 discloses an image projection system and an image geometric correction device. The image projection system connects partial images, which are projected by a plurality of image projectors, into a single image, thereby displaying the connected single image on one display screen. The image geometric correction device geometrically corrects the partial images projected by the plurality of the image projectors, so that overlapping portions between the partial images can be smoothly connected to each other. The image geometric correction device unifies the coordinate systems of images which are shot with a plurality of imaging apparatuses, thereby defining a unified coordinate system. Then, the correction device geometrically corrects the partial images projected by the plurality of the image projectors, using the image projection region on the unified coordinate system as a reference. This configuration allows the geometric correction to the projected images without severe accuracy of pre-setting of the imaging apparatuses at predetermined precise positions.

CITATION LIST

Patent Literature

PTL 1: International Publication WO 06/030501

SUMMARY

Setting of a relation between imaging apparatuses and image projectors requires a lot of time because a user has to always determine that which of the imaging apparatuses has shooting area that involves the projection image of which of the image projectors.

The present disclosure provides a projection image adjustment system which adjusts an image, which is configured with projection images displayed by a plurality of projection display apparatuses, to have a desired shape or characteristics, through use of a plurality of imaging apparatuses. The system allows the user to easily check to see whether or not a selected imaging apparatus involves the projection regions of designated projection display apparatuses. Moreover, if the selected imaging apparatus does not involve the projection regions, the user can easily perform operations of changing parameters that includes: the positions of the imaging apparatuses, the selection of the imaging apparatuses, and the projection regions of the projection display apparatuses.

The projection image adjustment system according to the present disclosure includes: a plurality of projection display apparatuses for projecting projection images on a projection screen; a first imaging apparatus for shooting a projection image of the projection images displayed on the projection screen; a second imaging apparatus for shooting the projection images displayed on the projection screen; and a controller for controlling the plurality of the projection display apparatuses, the first imaging apparatus, and the second imaging apparatus. The controller includes: an imaging-apparatus selecting unit, a shooting-region setting unit, a pattern projection unit, and a shot-image display unit. The imaging-apparatus selecting unit selects one of the first imaging apparatus and the second imaging apparatus. The shooting-region setting unit sets a first charge-of-shoot region for a projection display apparatus of the plurality of the projection display apparatuses and a second charge-of-shoot region for a projection display apparatus of the plurality of the projection display apparatuses. The first imaging apparatus is in charge of shooting the first charge-of-shoot region, while the second imaging apparatus is in charge of shooting the second charge-of-shoot region. Such a setting is made such that at least one of the plurality of the projection display apparatuses is shared by the first and second charge-of-shoot regions. The pattern projection unit projects a first format pattern by using the projection display apparatus corresponding to either the first or the second charge-of-shoot region, depending on the one selected by the imaging-apparatus selecting unit. The shot-image display unit displays an image shot by either the first or the second imaging apparatus, depending on the one selected by the imaging-apparatus selecting unit.

The projection image adjustment system according to the present disclosure allows the user to easily check to see whether or not a selected imaging apparatus involves the projection regions of designated projection display apparatuses. If not, the user can easily perform operations of changing parameters that includes: the positions of the imaging apparatuses, the selection of the imaging apparatuses, and the projection regions of the projection display apparatuses.

BRIEF DESCRIPTION OF DRAWINGS

FIG. 9 is a table illustrating a data structure which stores information on arrangement of the projectors at the time of connecting the projectors;

FIG. 11 is a view of an application screen (prior to the setting) which is about to be used for setting the arrangement of the projectors;

FIG. 13 is a view of an application screen (after the setting) which has been used for setting the arrangement of the projectors;

FIG. 14 is a table illustrating a data structure (after the setting) which stores information on the arrangement of the projectors;

FIG. 20 is a table illustrating a data structure which stores information on the arrangement of the cameras;

DETAILED DESCRIPTION OF THE PREFERRED EMBODIMENTS

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the inventor provides the accompanying drawings and the following descriptions so as to facilitate fully understanding of the present disclosure by those skilled in the art, and have no intention of imposing any limitation on the subject matter set forth in the appended claims.

EXEMPLARY EMBODIMENT

Hereinafter, an exemplary embodiment will be described with reference to FIGS. 1 to 24.

1-1. Network Connection Configuration and Arrangement Configuration

Figure 1:
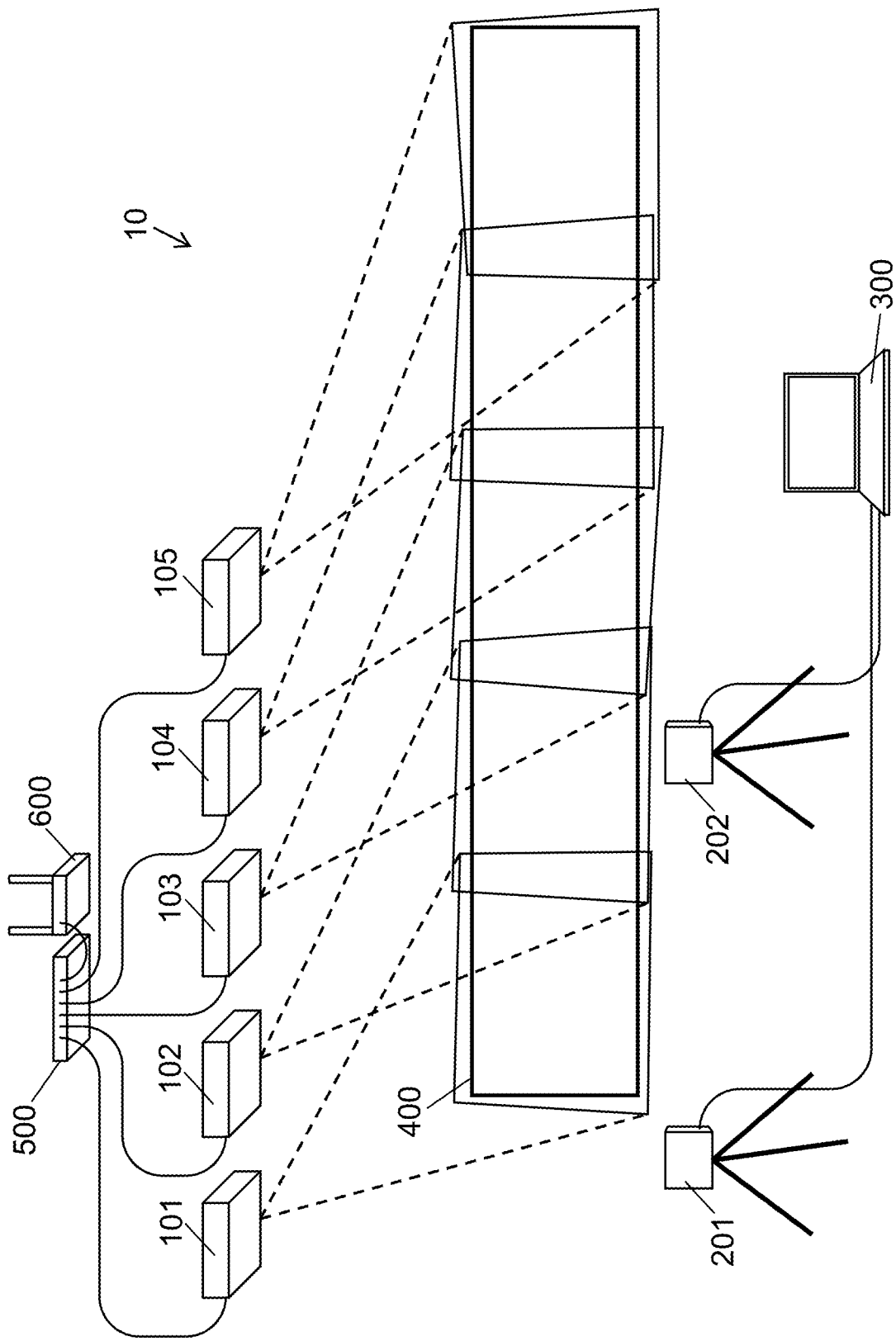
FIG. 1 is a schematic view illustrating a state in which projectors are connected to a network.

FIG. 1 is a schematic view illustrating a state in which projectors (projection display apparatuses) 101 to 105, cameras (imaging apparatuses) 201 and 202, and personal computer (PC) 300 used for performing adjustment are connected to a network, according to the embodiment. The plurality of projectors 101 to 105 is disposed in front of screen (projection screen) 400 so as to project images on screen 400. These projectors are connected with PC 300 used for adjustment, via local area network (LAN) cables, network hub 500, and wireless access point 600. The plurality of cameras 201 and 202 is disposed in front of screen 400 so as to shoot a predetermined region that contains screen 400. These cameras are connected with PC 300 used for adjustment, via a wired or wireless network. Projection image adjustment system 10 is configured such that projectors 101 to 105, cameras 201 and 202, and PC 300 used for adjustment are connected to the network.

For example, as shown in FIG. 1, projectors 101 to 105 are arranged in a lateral line and the screen is split into split-display regions. Each of the projectors projects a split-image on the corresponding split-display region, with the split-image configuring a display image that is displayed on the entire screen. This configuration allows such a display image to be displayed on screen 400 even in the case where the screen is an extremely horizontally oriented one. In the case where such split-images are displayed, a technique so-called "edge-blending" is generally used. By the technique, the split-images are projected such that parts of projection regions of the adjacent split-images are overlapped with each other. Then, luminance of the overlapping regions of the split-images is gradually cross-faded to make the overlapping regions inconspicuous. Moreover, although not shown in the Figures, a technique so-called "stacking projection" is sometimes used. By the technique, images are displayed from a plurality of projectors on the same projection regions such that the projected images are superimposed on top of one another to provide an image with higher luminance.

Figure 2:
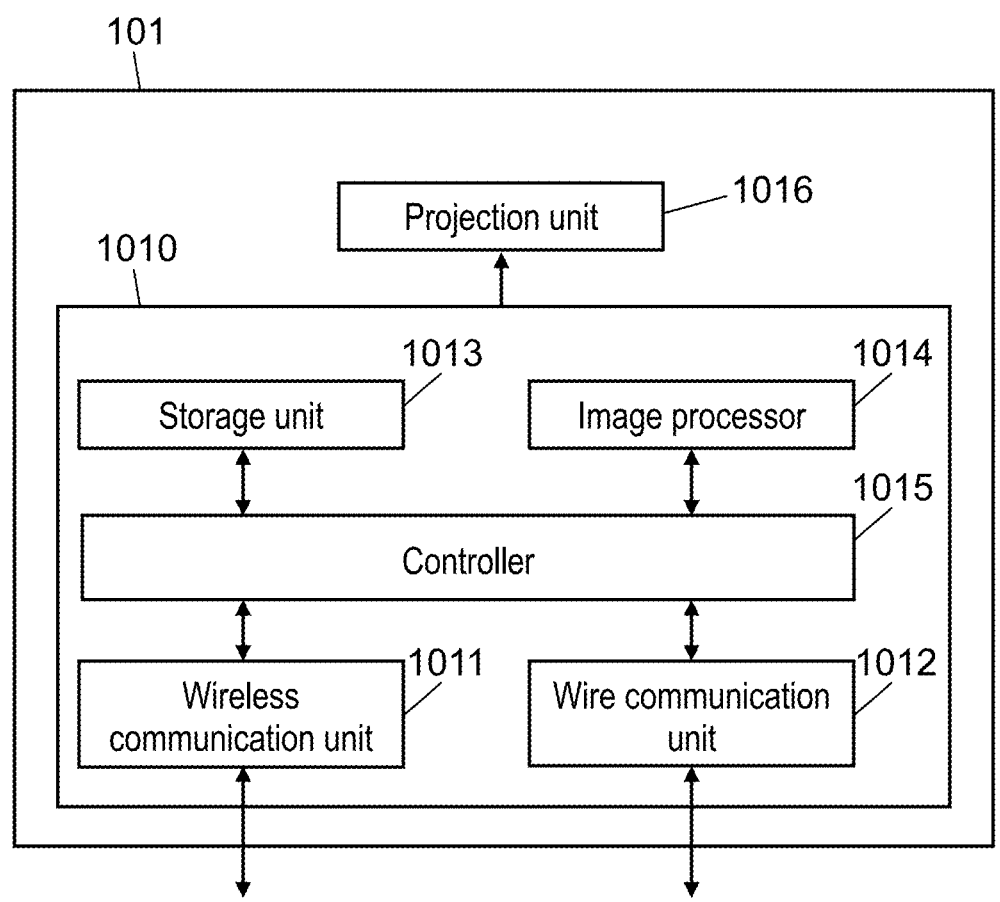
FIG. 2 is a functional block diagram of a projector.

FIG. 2 is a functional block diagram of projector 101 used in the embodiment. Since projectors 102 to 105 have the same configuration, a description will be made regarding projector 101 only. Projector 101 is configured including: image generating unit 1010 for generating an image and projection unit 1016 for projecting the image on the projection screen. Image generating unit 1010 is configured including: wireless communication unit 1011 having an access point function for wireless communication; wire communication unit 1012 connected with a LAN cable for wire communication; storage unit 1013; image processor 1014; and controller 1015. Storage unit 1013 stores image information on projection patterns to be described later, identification data which indicate service set identifier (SSID) of the projection display apparatus itself, and the like.

Figure 3:
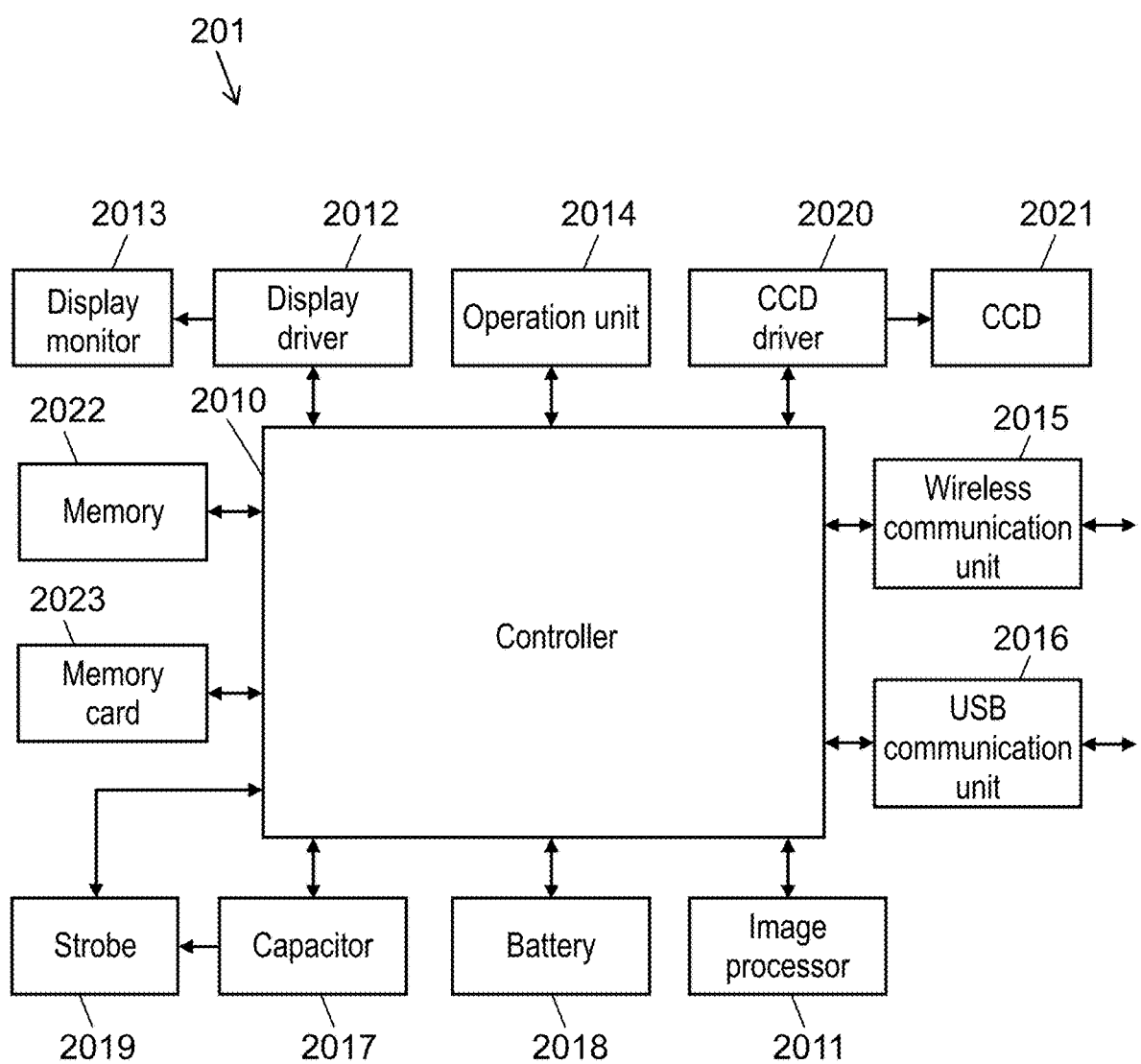
FIG. 3 is a functional block diagram of a camera.

FIG. 3 is a functional block diagram of camera 201. Since camera 202 has the same function blocks, a description will be made regarding camera 201 only. Camera 201 includes: controller 2010, image processor 2011, display driver 2012, display monitor 2013, operation unit 2014 serving as a key-input unit, wireless communication unit 2015 serving as a wireless LAN circuit, universal serial bus (USB) communication unit 2016 serving as a USB interface circuit, capacitor 2017, battery 2018, strobe 2019, charge coupled device (CCD) driver 2020, CCD 2021, and memory 2022. Moreover, memory card 2023 serving as a record medium is loaded in a card slot not-shown.

Controller 2010 is a circuit for executing various types of control and processes, which is configured including a microcomputer. Image processor 2011 is a circuit for performing compression and decompression of shot-image data. Display driver 2012 is a drive circuit for controlling the image displayed on display monitor 2013. Operation unit 2014 is a circuit for detecting operations of buttons, switches, dials, etc. which are disposed in camera 201.

Wireless communication unit 2015 is a communication circuit for communicating with external apparatuses by wireless. USB communication unit 2016 is a communication circuit for communicating with external apparatuses via a USB cable. Capacitor 2017 is charged when receiving electric power from battery 2018. The charged power is used for strobe 2019 to flash light. Battery 2018 is a power source such as a lithium-ion rechargeable battery which supplies electric power required for the imaging apparatuses to operate.

Strobe 2019 irradiates an object with fill light, thereby allowing the shooting even in a dark ambient environment. CCD driver 2020 is a circuit for driving CCD 2021. CCD 2021 is an imaging element for shooting an object image via an image capturing lens. Upon shooting the object image with CCD 2021, CCD 2021 outputs a shot-image signal to CCD driver 2020. The shot-image signal is converted to shot-image data. Then, the converted data are output to controller 2010.

Memory 2022 is a nonvolatile semiconductor memory which stores programs, data, etc. used for the controller to perform control. Memory card 2023 records various kinds of information, such as shot-image information acquired by the imaging apparatus, under the control of the controller.

Figure 4:
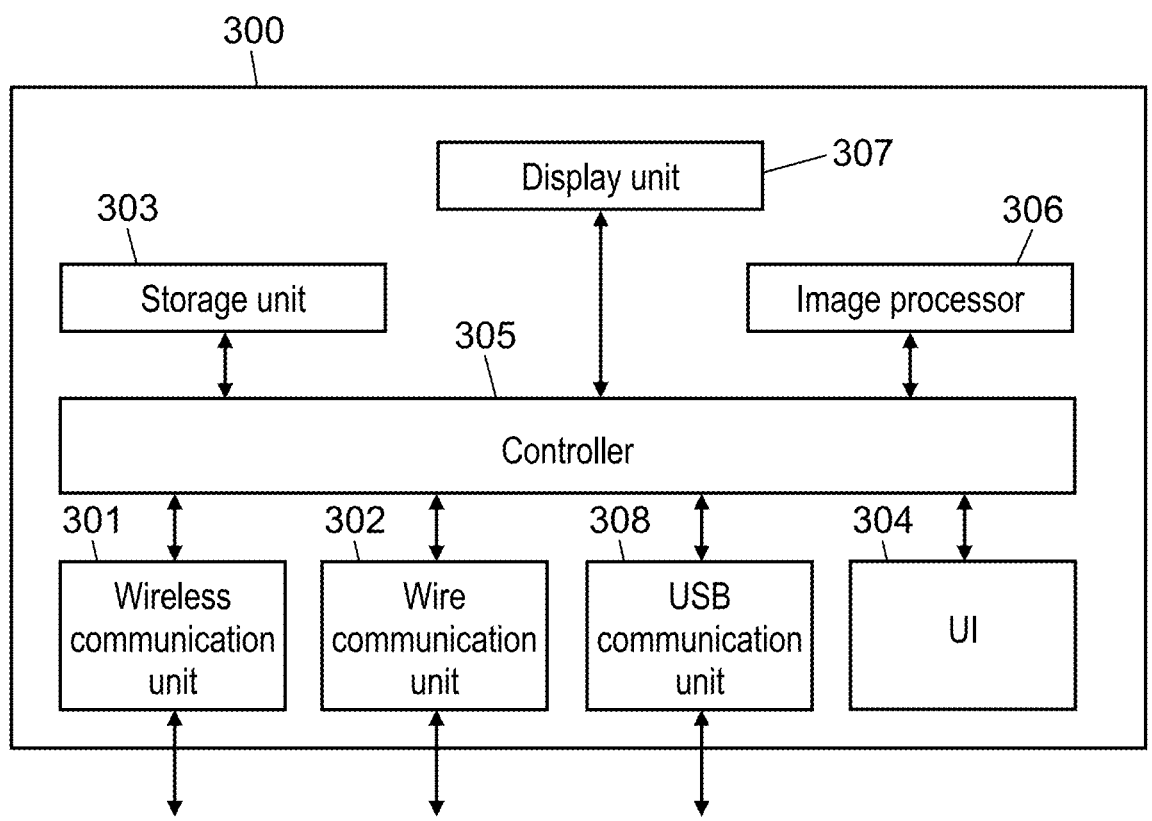
FIG. 4 is a functional block diagram of a personal computer (PC) used for performing adjustment.

FIG. 4 is a functional block diagram of PC 300 used for performing adjustment according to the embodiment. PC 300 for adjustment is configured including: wireless communication unit 301, wire communication unit 302, storage unit 303 for storing image data and the like, user interface (UI) 304 for receiving selection instructions from a user, controller 305, image processor 306 for generating an image based on the image data and the like, and display unit 307 for displaying the image. Note that PC 300 for adjustment may be configured with commonly used hardware. For example, wireless communication unit 301 may be a wireless LAN unit and the like; storage unit 303 may be a hard disk, random access memory (RAM), and the like; UI 304 may be a keyboard, mouse, and the like; controller 305 may be a central processing unit (CPU) and the like; display unit 307 may be a liquid crystal display and the like; and USB communication unit 308 may be configured with a USB port and the like. Here, PC 300 for adjustment is an example of the controller.

The plurality of cameras 201 and 202 are connected with PC 300 for adjustment, via USB communication unit 2016. In accordance with the instructions from PC 300 for adjustment, each of cameras 201 and 202 shoots an area that partially contains screen 400, and then transmits thus-shot image data to PC 300 for adjustment. Cameras 201 and 202 may be connected with PC 300 for adjustment, through use of wireless communication unit 2015 and wireless communication unit 301, by means of a WiFi wireless communication function and the like.

PC 300 for adjustment issues commands to projectors 101 to 105 and cameras 201 and 202, thereby controlling them. Moreover, as will be described later, in order to adjust the images projected by projectors 101 to 105 to screen 400, PC 300 for adjustment commands controller 1015 to acquire the state of projection, to compute correction data, and to transmit the correction data.

1-2. Operation

Hereinafter, operations of thus-configured projection image adjustment system 10 will be described.

Figure 5:
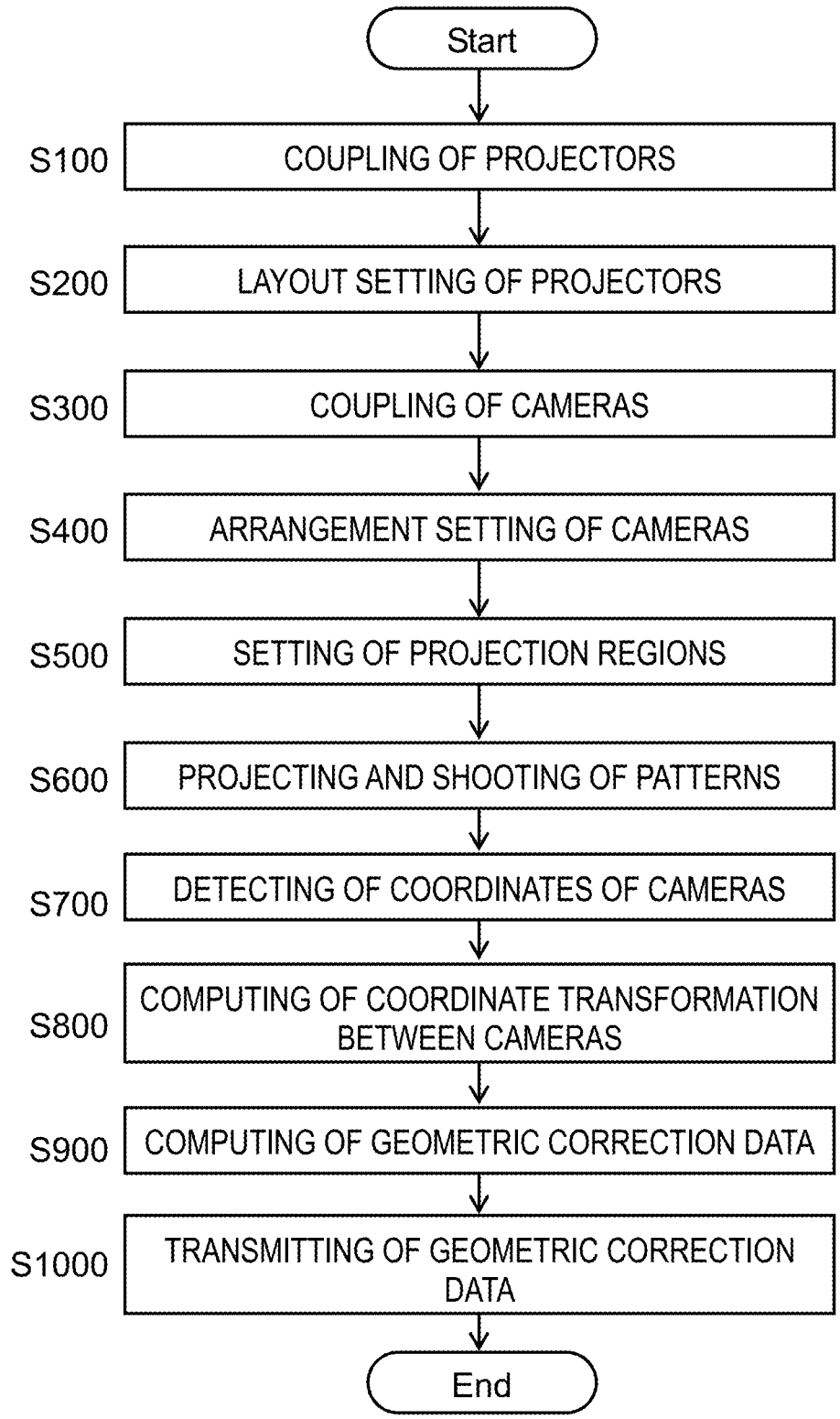
FIG. 5 is a flowchart illustrating an operation in which projected images are adjusted to a display screen.
Figure 6:
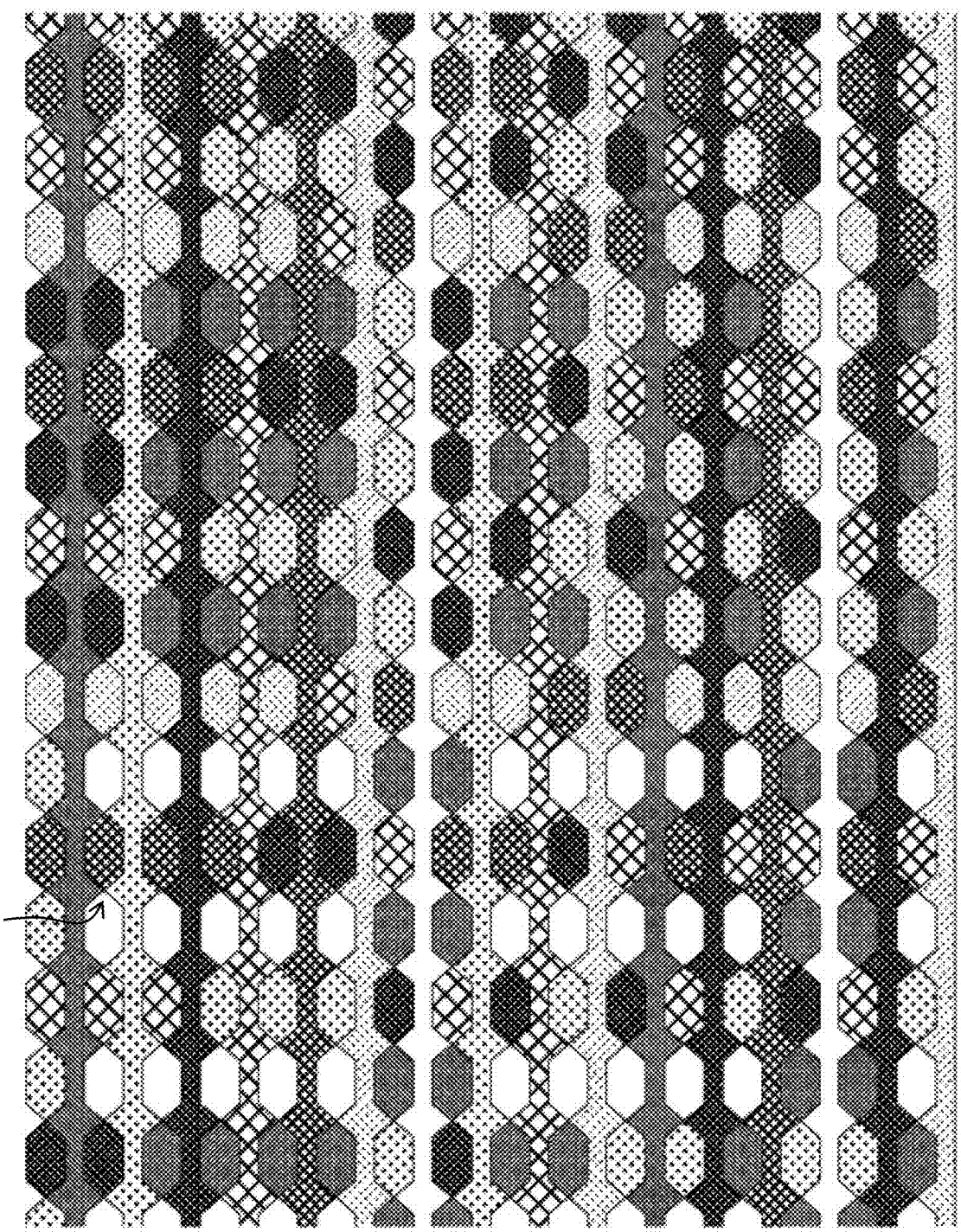
FIG. 6 is a view of a test pattern which is used to detect camera coordinates.

FIG. 5 is a flowchart illustrating an operation (referred to as the "projection-region automatic-adjusting operation," hereinafter) of PC 300 used for performing adjustment. In the operation, the PC controls projectors 101 to 105 such that the projected images are adjusted to fall within the region of screen 400. The projection-region automatic-adjusting operation of PC 300 for adjustment is performed by executing a specific application program. The operation includes a setting phase (S100 to S500) and an automatic execution phase (S600 to S1000).

Upon starting the projection-region automatic-adjusting operation, PC 300 for adjustment starts by establishing the network connection with projectors 101 to 105, and then assigns a temporary identification (ID) to each of the projectors. An increasing whole number, starting from 1 (one), is assigned to each of the projectors (in order in which the projectors are connected with the PC, for example). This makes the projectors identifiable (S100). Next, the PC designates each of the projectors to project the designated images on screen 400, thereby determining the number of the projectors that are intended to project images aligned in a row on the screen, determining the number of the projectors that are intended to project images aligned in a column on the screen, and determining the number of the projectors that are intended to perform a stacking projection. Then, the PC determines a correspondence between the positions of arrangement of the projectors and the partial regions of screen 400, in the actual arrangement. That is, the correspondence shows that each of the projectors temporarily identified in Step S100 can project the corresponding image on which of the partial regions of the screen. Then, based on the thus-determined correspondence, the PC assigns a projector ID to each of the projectors (S200).

Next, cameras 201 and 202 to be used for adjustment are connected with PC 300 for adjustment. Then, the PC assigns an ID to each of the cameras. For example, an increasing whole number, starting from 1 (one), is assigned to each of the cameras, in order in which the cameras are connected with the PC. This makes the cameras identifiable (S300). Then, the PC designates each of the plurality of the cameras connected with the PC to shoot which of the projection regions of the projectors (S400). In particular, for the cameras positioned adjacent to each other, the designation is made such that both the adjacent cameras can shoot the projection image that is projected by at least one projector.

Next, the region of screen 400 is set on which projectors 101 to 105 project the images; and overlap widths are set with which the projection regions of adjacent projectors are overlapped to each other (S500). Specifically, the setting of the region of screen 400 is performed as follows: Cursors are displayed at regular intervals at the periphery of screen 400. Then, the coordinates and projector ID are recorded, with both of them being associated with each of the cursors.

After all the settings up to here have been completed, an instruction to execute the operation is given, which causes the operation to shift into the automatic execution phase.

In order to obtain a relation between projection positions of the projectors and pixel positions of the cameras, a test pattern containing a plurality of feature points is projected by each of the projectors. Then, the projected test patterns are shot with the cameras (S600). Based on the projection regions of projectors covered by each of the cameras that have been designated in Step S400, the test patterns projected by such projectors are shot with the designated camera, with the test patterns being projected on the projection regions in all possible combinations of the projectors. The test pattern like that shown in FIG. 6 can be projected as follows: That is, for example, the pattern is stored in advance in storage unit 303 of PC 300 for adjustment. The stored pattern is transmitted to each of the projectors where the pattern is projected.

Next, from the thus-shot images, camera coordinates of the plurality of the feature points contained in the test pattern are detected. Then, correspondences are determined between projector coordinates of the feature points and the camera coordinates of the feature points. Based on the correspondences, a coordinate transformation table is determined with which the projector coordinate system can be transformed to the camera coordinate system (S700). Next, for the cameras positioned adjacent to each other, the camera coordinates of the same feature points of the projected image projected by the same projector are obtained by each of the adjacent cameras. Correspondences are determined between the camera coordinates obtained by one camera of the adjacent two and those obtained by the other camera. From the correspondences, a coordinate transformation equation between the adjacent cameras is computed (S800). A method of computing the coordinate transformation equation between the cameras is known as shown in Patent Literature 1, paragraphs 0025 to 0027, for example, as follows: Use of the same feature points of the projection image projected by the same projector, determines the correspondences between the camera coordinates obtained by one camera and those obtained by the other camera. Then, a planar-projection transformation homography matrix "H" is computed based on the correspondences for not smaller than four feature points.

Next, PC 300 used for performing adjustment unifies the coordinate systems based on the values recorded as the coordinate system of each of the projectors, by means of the coordinate transformation table determined in Step S700 and the coordinate transformation equation between the cameras determined in Step S800. Then, the PC computes geometric correction data to be used to adjust the projection images projected by the projectors to the projection region of screen 400, based on positional information on the projectors and positional information on the projection region of screen 400 which has been set in Step S500 (S900).

Figure 7:
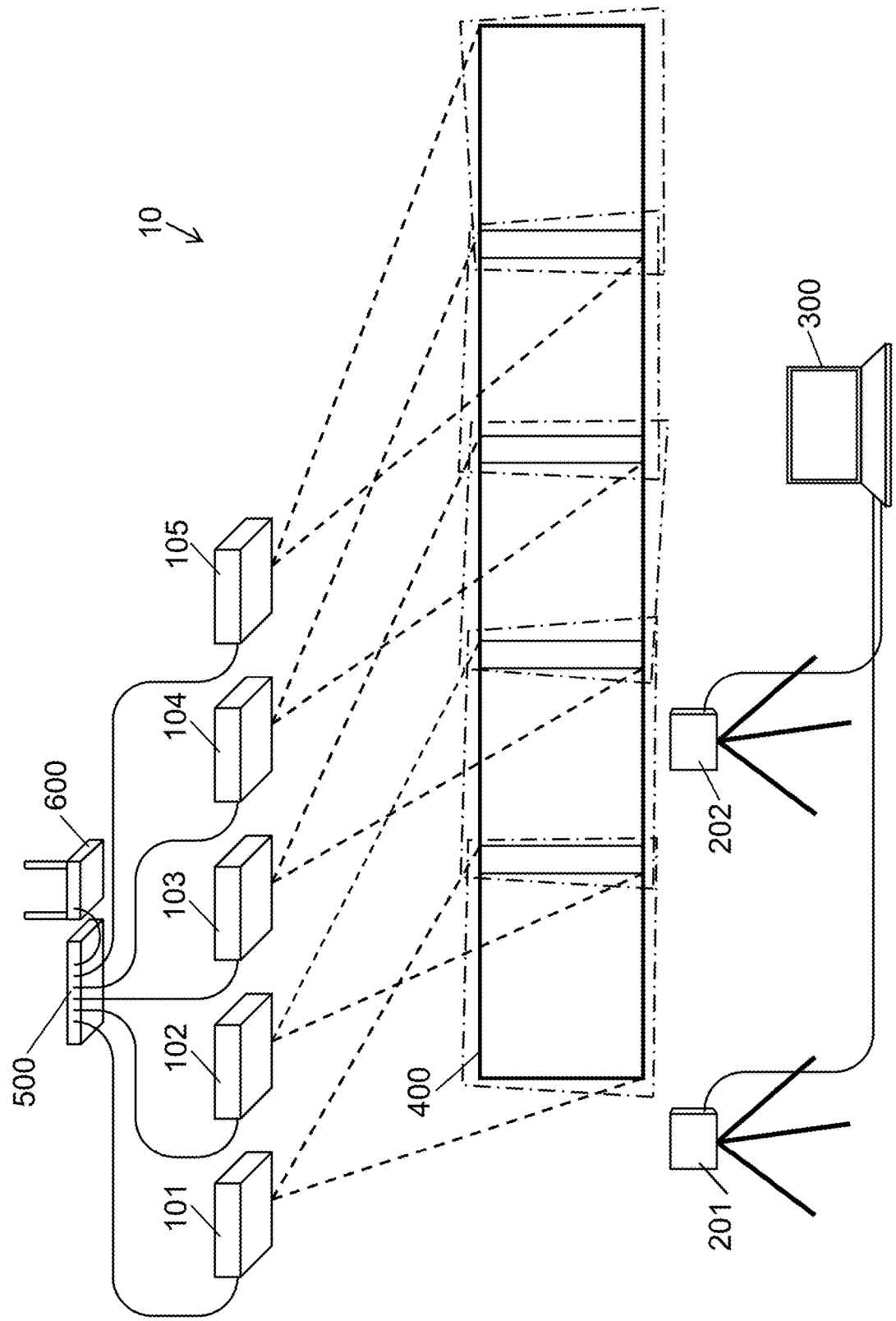
FIG. 7 is a view of a network connection after projection regions of the projectors have been adjusted.

Finally, PC 300 for adjustment transmits, to each of the projectors, the thus-computed geometric correction data and the overlap width (S1000). In this operation, as shown in FIG. 7, the projection images projected by the projectors are adjusted to fit to screen 400 and their overlapping regions are smoothly connected. Incidentally, before the adjustment operation, peripheral parts of the projection images would lie off the edge of the screen. The projection images before the adjustment are indicated by the dot-and-dash lines in the Figure.

Of the operations of the flowchart described above, the operations in the setting phase (S100 to S500) will be described in detail hereinafter.

Figure 8:
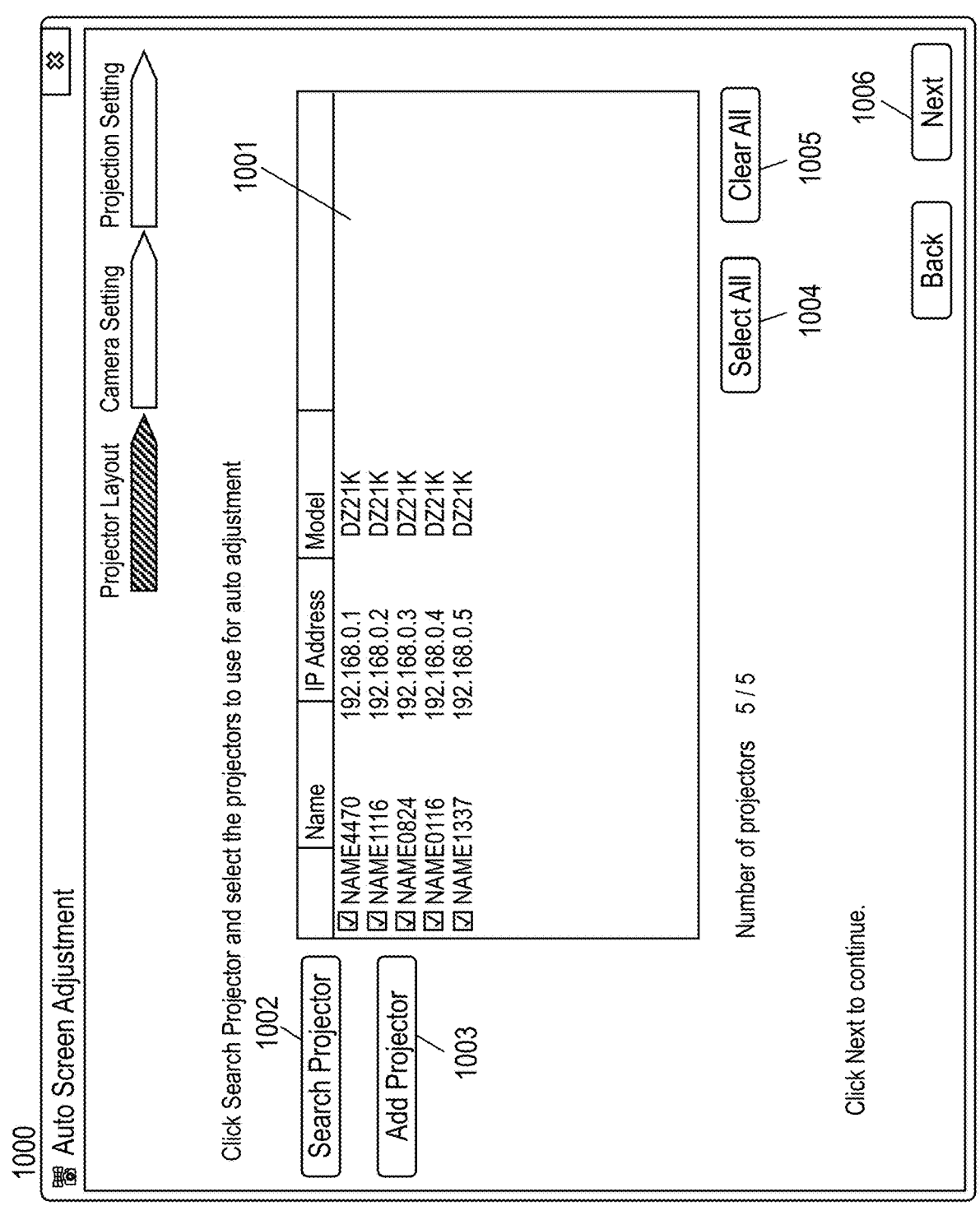
FIG. 8 is a view of an application screen which is used for connecting the projectors.

FIG. 8 is a view of application screen 1000 in Step S100 in which the network connection is established between PC 300 for adjustment and projectors 101 to 105, with the projectors being assigned with temporary IDs that makes the projectors identifiable. The application screen is displayed on display unit 307 of PC 300 for adjustment. Upon pressing "Search Projector" button 1002, PC 300 for adjustment searches the network to find projectors 101 to 105 that are present on the network, and tabulates the projectors in list 1001 shown on the right of the application screen. Moreover, upon pressing "Add Projector" button 1003, an input screen (not shown) is displayed for allowing a user to input information on another projector, which the user wants to add to the operation, with the information including its IP address and name. When such information is inputted, PC 300 for adjustment confirms the presence of the projector to be added, by means of communications. Only after its presence has been confirmed, the projector is added to list 1001 that is being displayed. Through these operations, the information on all the listed projectors, which have been confirmed to be being connected to the network, is displayed in list 1001, with the information including the names, IP addresses, model names of the listed projectors.

Next, from the list, the user selects projectors which the user wants to adjust, and then places a check mark on each of the selected projectors. If "Select All" button 1004 displayed under the list is pressed, check marks are placed on all the projectors listed in the list. Moreover, upon pressing "Clear All" button 1005, the check marks disappear from all the projectors listed in the list. Upon pressing "Next" button 1006 with the check marks being placed on the projectors which the user wants to adjust, the operation proceeds to the next step.

At this moment, a temporary ID is assigned to each of the projectors selected with the check marks. The projectors selected with the check marks in list 1001 are assigned with temporary IDs as follows: That is, as shown in FIG. 9, an increasing whole number, i.e. 1, 2, 3, . . . and so on, is sequentially assigned to each of the projectors with the check marks, in the order from top to bottom of the list. At this point in time, the data such as those shown in FIG. 9 are stored, as internal information of the application, in storage unit 303 of PC 300 for adjustment.

Figure 10:
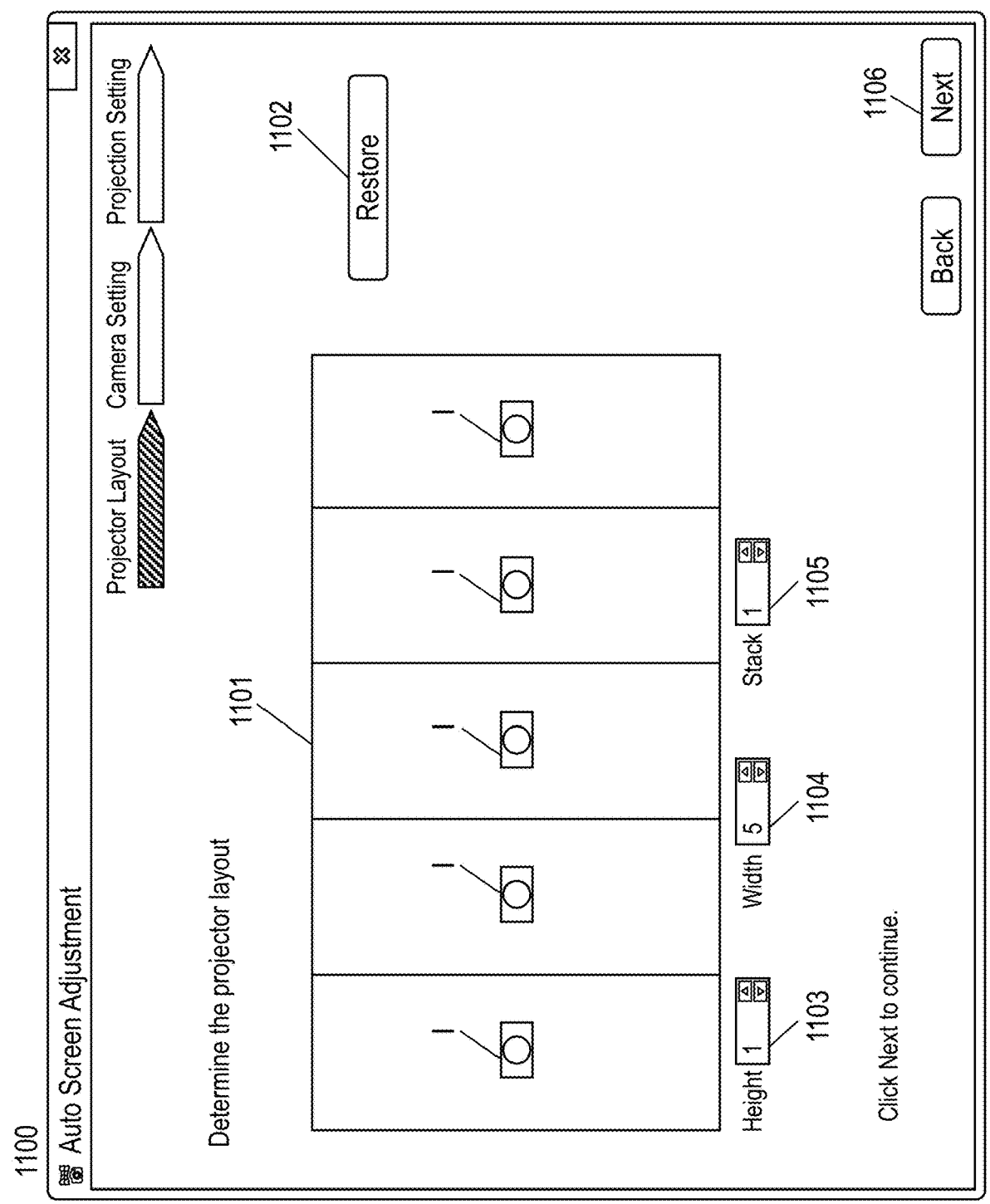
FIG. 10 is a view of an application screen which is used for setting the arrangement of the projectors.

FIGS. 10 and 11 are views of application screens that are used in Step S200 in which an arrangement relation of the projectors selected in Step S100 is set. First, by using the application screen shown in FIG. 10, a layout is set in which the selected projectors are arranged with respect to screen 400. For example, like the schematic view shown in FIG. 1, in the case where five projectors are arranged in a row to project the images that form one image on screen 400, the user performs the operation as follows: That is, numeral "1 (one)" is inputted to "Height" item input box 1103; numeral "5 (five)" is inputted to "Width" item input box 1104; numeral "1 (one)" is inputted to "Stack" item input box 1105; and then "Next" button 1106 is pressed. In box 1101 displayed on display unit 307, the thus-determined layout of the projectors is indicated by five icons of "I" that are aligned in a horizontal direction.

In another case where screen 400 is split into 2 (two) in a column by 3 (three) in a row planes, and yet where two projectors are used to project the same images on each of the planes, with the images being superimposed on one another to obtain high luminance, the user performs the operation as follows: That is, numeral "2 (two)" is inputted to "Height" item input box 1103; numeral "3 (three)" is inputted to "Width" item input box 1104; and numeral "2 (two)" is inputted to "Stack" item input box 1105. This case requires 12 units of the projectors; therefore, 12 projectors are connected and selected, in advance, in Step S100.

In cases where an adjustment has previously been carried out, the previous-setting information can be read through use of "Restore" button 1102 shown in FIG. 10. At a timing of pressing "Next" button 1106, PC 300 for adjustment compares the number of units of the projectors selected in Step S100 with the number "N" (N=Height×Width×Stack) of units of projectors which are required for the setting. If the compared numbers are not equal, the PC displays an error massage (not shown) to prompt the user to perform rearrangement.

Figure 12:
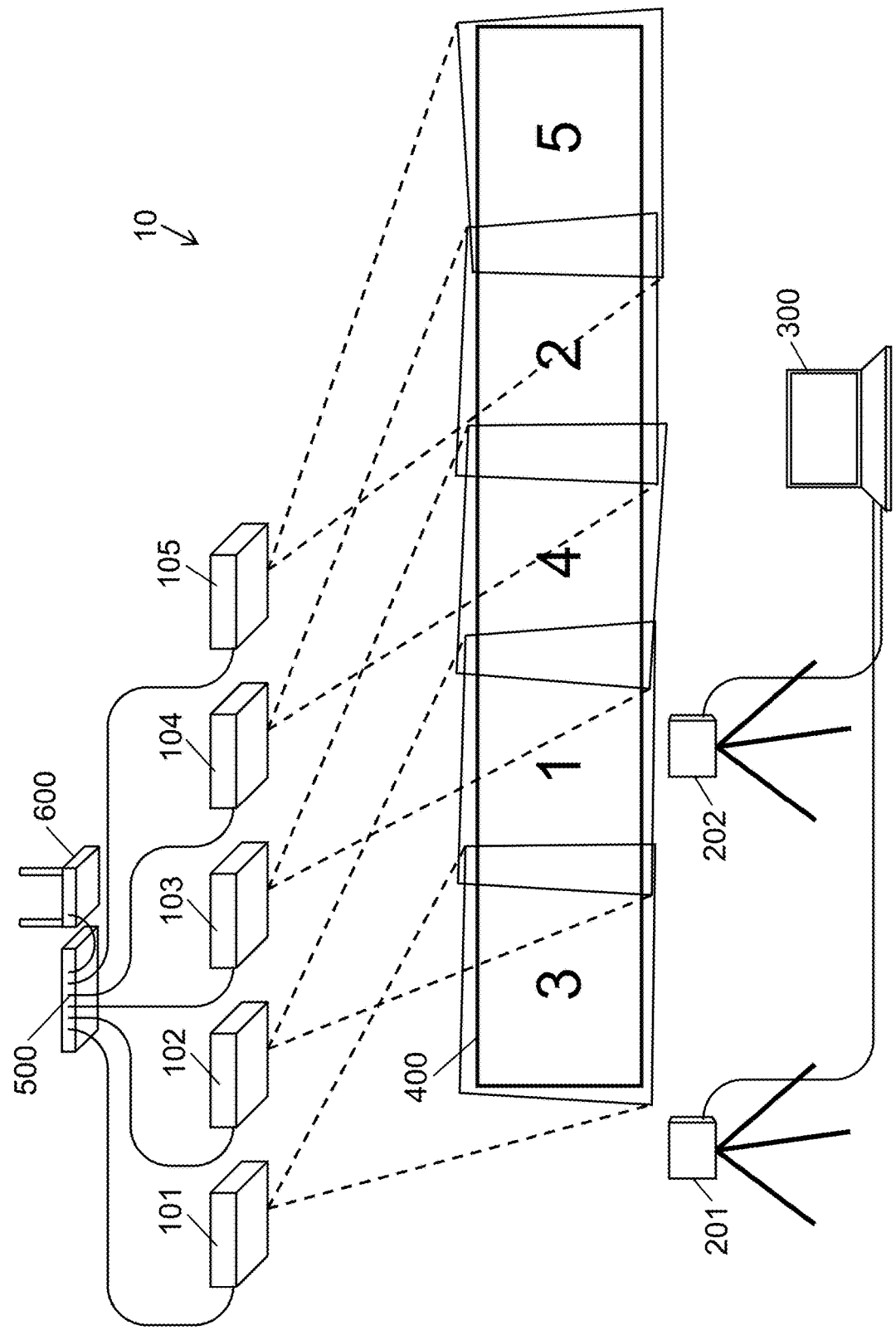
FIG. 12 is a view of an example of the projection by the projectors, during the operation of setting the arrangement of the projectors.

Next, by using application screen 1200 shown in FIG. 11, a layout of the projectors is set. At the timing of starting to display this application screen, each of the projectors projects, on screen 400, the numeral of its temporary ID that has been assigned to the projector (FIG. 12). In the embodiment, projector 101 is assigned with temporary ID=3 (IP address=192.168.0.3; projector name=Name 0824); projector 102 is assigned with temporary ID=1 (IP address=192.168.0.1; projector name=Name 4470); projector 103 is assigned with temporary ID=4 (IP address=192.168.0.4; projector name=Name 0116); projector 104 is assigned with temporary ID=2 (IP address=192.168.0.2; projector name=Name 1116); and projector 105 is assigned with temporary ID=5 (IP address=192.168.0.5; projector name=Name 1337).

In application screen 1200 shown in FIG. 11, box 1201 displayed on the left is a region to be used for setting the layout of the projectors. First, PC 300 for adjustment causes the projectors to project the numerals of their temporary IDs, with only the numeral of temporary ID=1 (one) being projected in a format different from that in which the numerals of the other temporary IDs are being projected. Such a different format allows the user to more easily determine which one of the projectors the user has to instruct. An example of the different format for the projected numeral may be such that only the color of the numeral of temporary ID=1 (one) is red while those of the other temporary IDs are white. Another example of the different format may be such that only the temporary ID of the projector which the user has to instruct is projected while the temporary IDs of the other projectors are not projected, with white patterns being projected there instead of the temporary IDs for the other projectors. This case is advantageous because, when a plurality of the projectors projects and superimposes the images on the same place, problematic overlapped-projection of the numerals does not take place, resulting in better ease of identification.

On screen 400, the user confirms the projection position of the temporary ID being projected in a format different from that in which the other temporary IDs are being projected. As shown in FIG. 12, the numeral of temporary ID=1 (one) is being projected at the 2nd projection position from the left of screen 400. This prompts the user to select (click) the corresponding cell (i.e. the 2nd cell from the left) in box 1201 displayed on the left side of application screen 1200. Upon selection of the cell, the number of temporary ID=1 (one) is set to the selected cell, that is, the position of projector 102 designated with temporary ID=1 (one) is set. In each of the cells in box 1201 shown in FIG. 11, an underbar "U" is displayed. The thus-set temporary ID is displayed at the position of the underbar "U."

After the setting of temporary ID=1 (one) has been completed, PC 300 for adjustment then causes only projector 104 assigned with temporary ID=2 (two) to project temporary ID=2 (two) in a format different from that in which the other projectors project their IDs. When user selects the corresponding cell, i.e. the 4th cell from the left, in box 1201 in the same manner as that described above, the numeral of temporary ID=2 (two) is displayed in the cell and the position of projector 104 is set. In this manner subsequently, the positions of the rest of the projectors are set. FIG. 13 is a view of application screen 1200 in the state in which the positions of all the projectors have been set.

After the positions of all the projectors have been set, "Next" button 1202 is pressed to determine the layout of the projectors. Upon determining the layout, each of the projectors is provided with its layout information on the position of the projector, with the information being expressed by a combination of numerals of the row, column, and layer of the position. It is the layout information that is the projector ID to be provided for the projector in Step S200 shown in FIG. 5. In the exemplary embodiment, such layout information is as follows: That is, leftmost projector 101 is provided with (row, column, layer)=(1, 1, 1); and rightmost projector 105 is provided with (row, column, layer)=(1, 5, 1). Here, in the case of stacking projection, the "layer" is used to identify a plurality of the projectors which is designated to project images to the same position (in terms of row and column). That is, the "layer" is assigned with an increasing whole number, i.e. 1, 2, . . . and so on, in the order in which the projectors are set in the same corresponding cell position in box 1201 that is displayed on the left in application screen 1200 shown in FIG. 13. At this point in time, data as shown in FIG. 14 are stored in storage unit 303, as internal information of the application.

Figure 15:
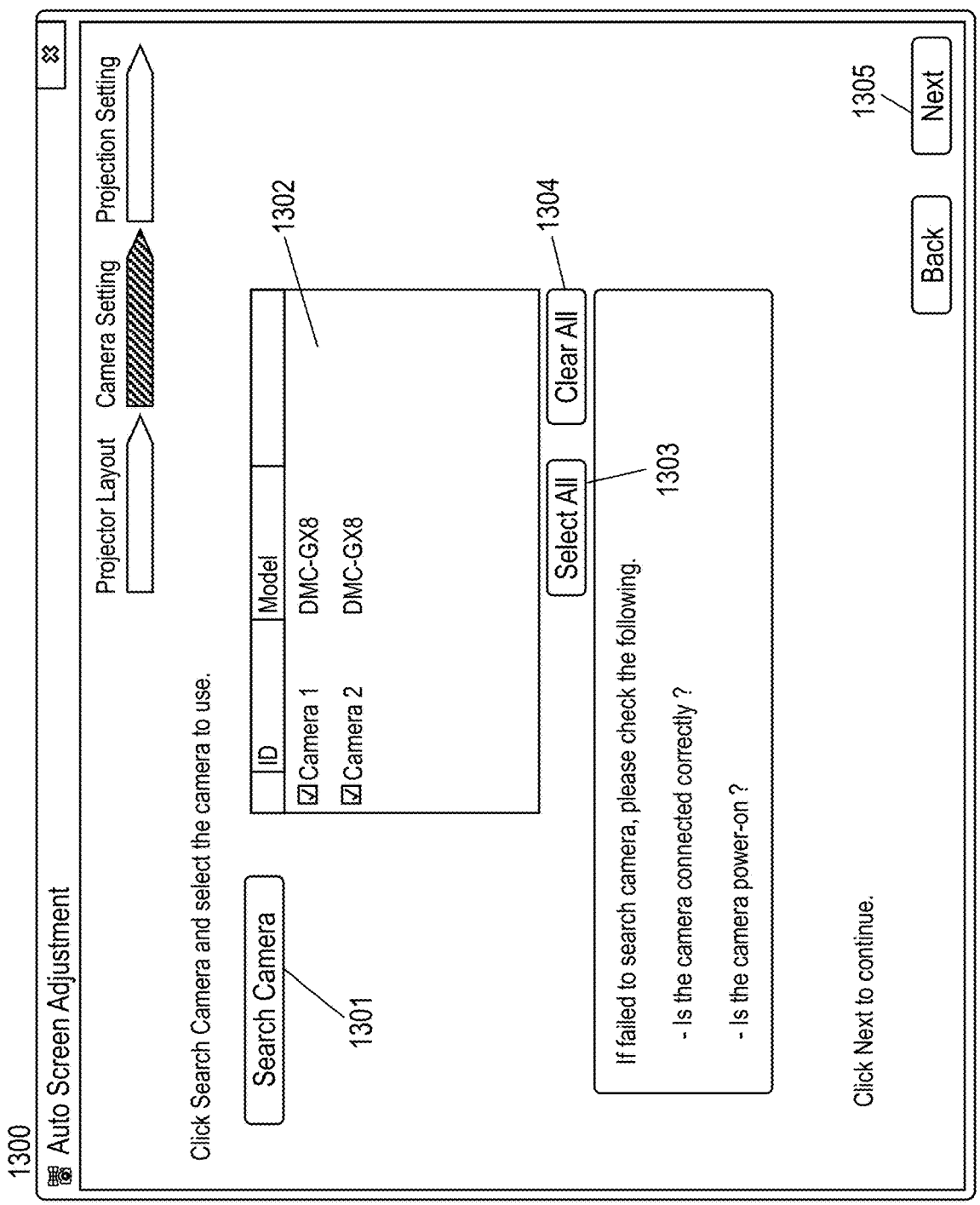
FIG. 15 is a view of an application screen which is used for coupling the cameras.

FIG. 15 is a view of application screen 1300 in Step S300 in which cameras 201 and 202 to be used for adjustment are connected with PC 300 for adjustment, with all the cameras being made identifiable with their IDs. Upon pressing "Search Camera" button 1301, PC 300 for adjustment searches for and finds the cameras which are connected with USB ports and the like, and then tabulates the IDs and model names of the cameras in list 1302 that is displayed on the right side of the screen. Starting with "Camera 1," the camera IDs are automatically and sequentially assigned to the cameras so as to identify the cameras found by the search.

Next, the user selects, from list 1302, cameras which the user wants to use for the adjustment, and places a check mark on each of the thus-selected cameras. If "Select All" button 1303 displayed under the list is pressed, check marks are placed on all the cameras listed in the list. Moreover, upon pressing "Clear All" button 1304, the check marks disappear from all the cameras listed in the list. Upon pressing "Next" button 1305 with the check marks being placed on the cameras which the user wants to use for the adjustment, the operation proceeds to the next step.

Figure 16:
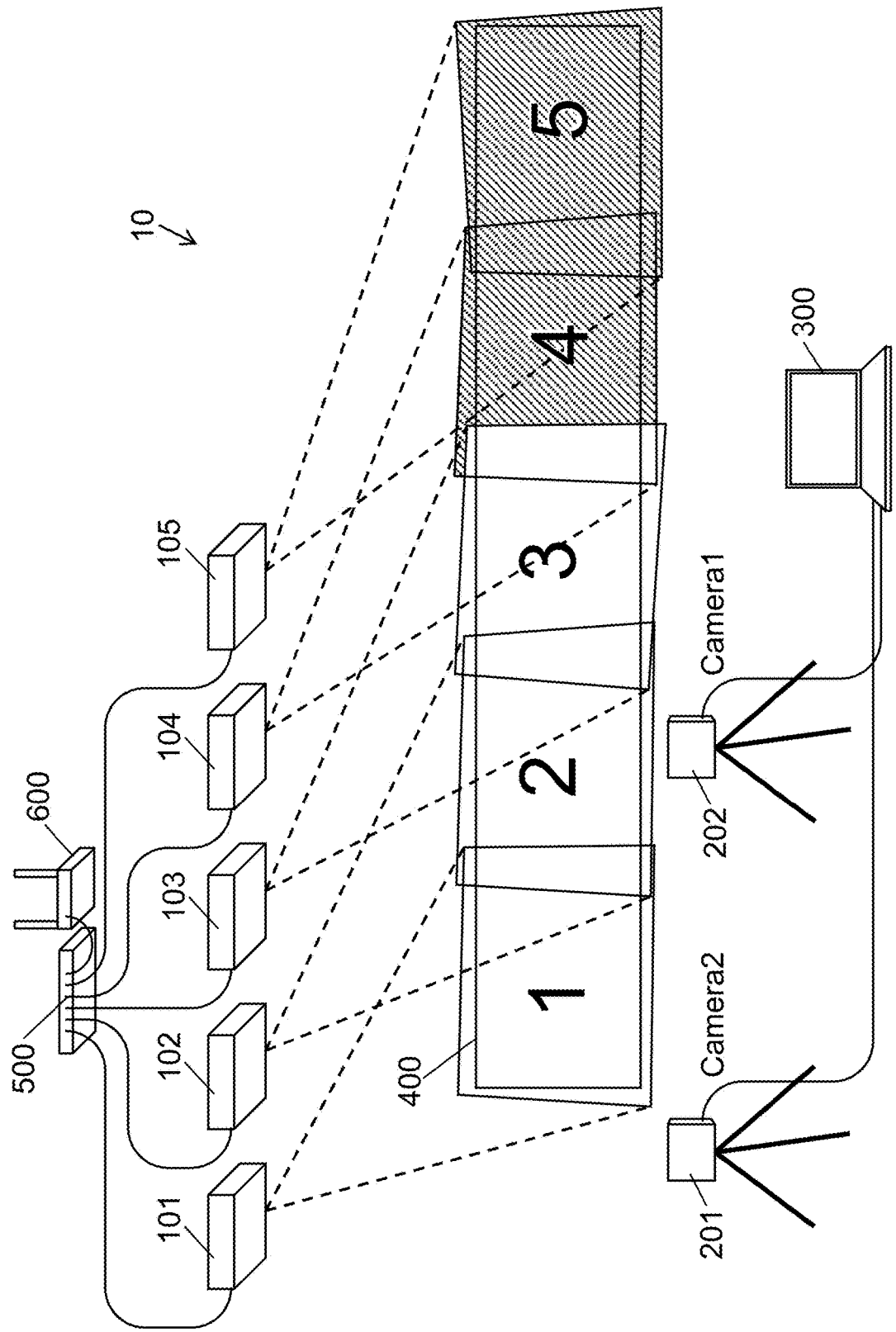
FIG. 16 is a view of an example of the projection by the projectors, during the operation of setting the cameras.
Figure 17:
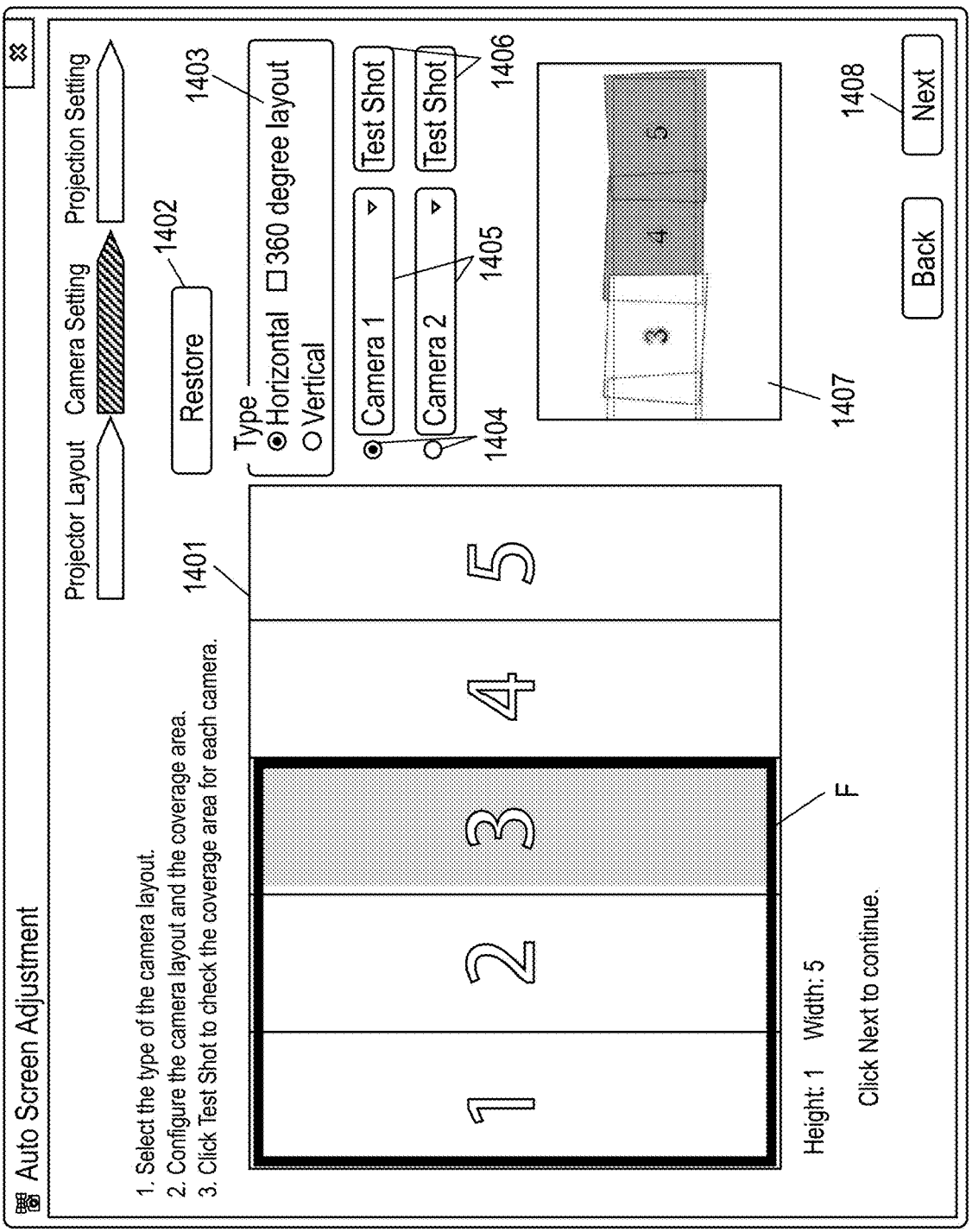
FIG. 17 is a view of an application screen which is used for setting the arrangement of the cameras.
Figure 18:
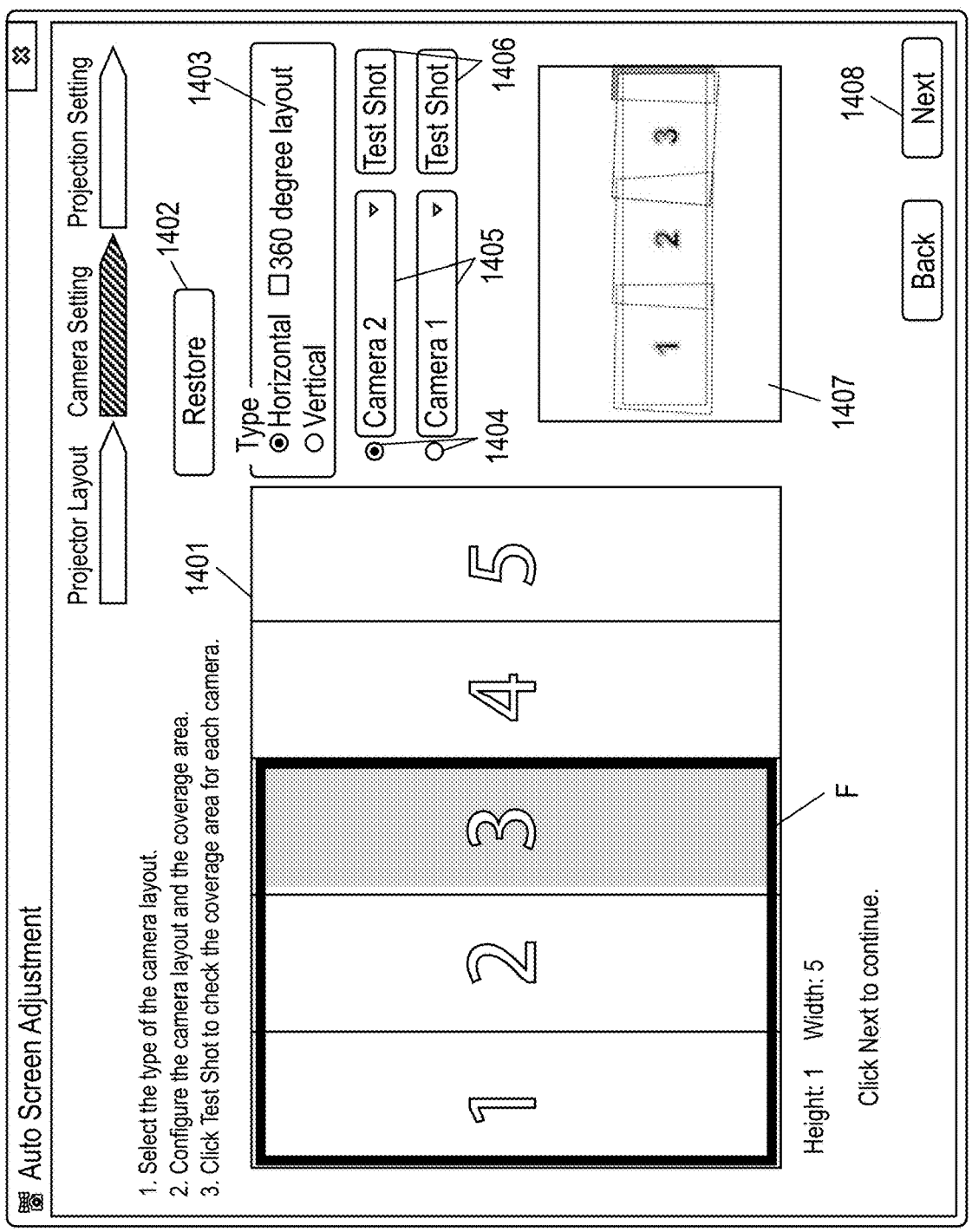
FIG. 18 is a view of an application screen which is used for setting the arrangement of the cameras.
Figure 19:
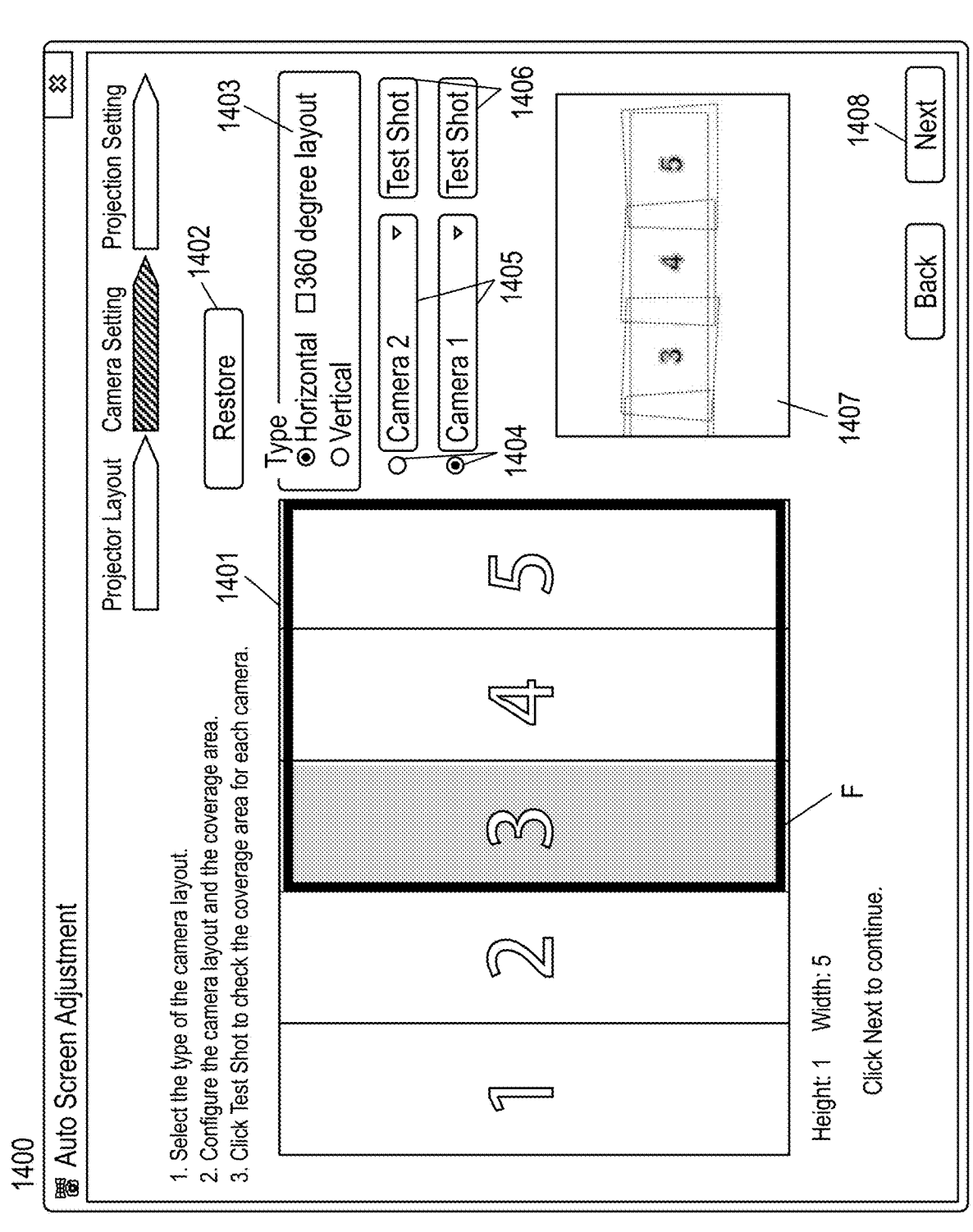
FIG. 19 is a view of an application screen which is used for setting the arrangement of the cameras.

FIGS. 17 to 19 are views of application screen 1400 in Step S400 in which each of the plurality of the connected cameras is designated to shoot the projection region of which of the projectors. As shown in FIG. 16, the camera arrangement in the embodiment is actually such that camera 201 on the left is assigned with ID=Camera 2 (two) while camera 202 on the right is assigned with ID=Camera 1 (one). Moreover, camera 201 on the left is arranged so as to shoot the projection regions of projectors 101 to 103, while camera 202 on the right is arranged so as to shoot the projection regions of projectors 103 to 105.

At the timing at which the screen is switched to application screen 1400 shown in FIG. 17, the initial state is determined. Arrangement type 1403 of the cameras is determined based on a comparison between the number of units of the projectors aligned in a column and the number of units of the projectors aligned in a row. In the embodiment, the arrangement of the projectors is 1 (one) in a column by 5 (five) in a row; therefore, arrangement type 1403 is set to be "Horizontal." Information on the arrangement type is displayed by a radio button in the application screen.

Next, for each of the cameras, the initial value of a charge-of-shoot region is determined in which the camera is intended to shoot projection regions of the corresponding projectors. This determination of the charge-of-shoot regions is made according to a rule as follows: The charge-of-shoot regions covered by the cameras are aligned from left to right when the camera arrangement type is "Horizontal" and from top to bottom when the camera arrangement type is "Vertical," in the order in which the IDs are assigned to the cameras. Moreover, the charge-of-shoot regions are determined such that the projectors covered by one of the cameras are equal in number to those covered by another of the cameras, and that the cameras positioned adjacent to each other cover at least one same projector. The expression "the projectors covered by one of the cameras are equal in number to those covered by another of the cameras" means the situation as follows: In the case of two cameras being used, the initial values of their charge-of-shoot regions are preferably determined such that the number of units of the projectors covered by one of the two cameras is equal or almost equal to that covered by the other. Moreover, the expression "the cameras positioned adjacent to each other covers at least one same projector" means the situation as follows: In the embodiment, both the two cameras cover projector 103 involved in a charge-of-shoot region that is shared and covered by the two cameras.

According to the rule of determination described above, in the embodiment, the charge-of-shoot regions are determined such that one projector, i.e. projector 103 with row number 3 (three), is involved in the charge-of-shoot region that is shared and covered by camera 201 (Camera 2) and camera 202 (Camera 1). Then, the initial values of the charge-of-shoot regions are determined such that camera 202 (Camera 1) covers projectors 101 to 103 with row numbers 1 to 3 and camera 201 (Camera 2) covers projectors 103 to 105 with row numbers 1 to 3. Unfortunately, in the actual arrangement as shown in FIG. 16, camera 202 (Camera 1) are disposed on the right so as to shoot the projection images projected by projectors 103 to 105 and camera 201 (Camera 2) are disposed on the left so as to shoot the projection images projected by projectors 101 to 103. This requires the user to properly set the charge-of-shoot regions, by operating application screen 1400.

On the left of application screen 1400 shown in FIG. 17, projector arrangement information 1401 is displayed. In the case where the arrangement of the projectors is 1 (one) in a column by 5 (five) in a row, row numbers 1 to 5 are assigned sequentially from left to right. On the right side of projector arrangement information 1401, there are displayed radio buttons 1404 which are equal in number to the cameras to be used for the adjustment and list boxes 1405 which indicate the IDs of the cameras. The radio buttons accompanied with the list boxes, which are arranged from top to bottom, correspond sequentially and respectively to the charge-of-shoot regions which are arranged from left to right (from top to bottom when the arrangement type of the cameras is "Vertical"). In the initial state, the top one of radio buttons 1404 is ON and row numbers 1 to 3 shown in projector arrangement information 1401 are surrounded by frame "F," thereby indicating that the charge-of-shoot region covered by the corresponding camera involves row numbers 1 to 3.

At the same time, that is, at the timing at which the application screen is switched to the application screen shown in FIG. 17, each of the actually-arranged projectors projects the corresponding row number that is assigned to the projector. When the arrangement type of the cameras is "Vertical," each of the projectors projects the corresponding column number that is assigned to the projector. Moreover, in the case of stacking projection, only the projectors of layer "1 (one)" are allowed to project the numbers, so that a plurality of numbers are not projected to the same position, resulting in ease of viewing.

Moreover, in accordance with instructions from PC 300 used for performing the adjustment, the projectors project the projection images of the row numbers in the following manner. That is, the format of the row numbers which are projected by a group of the projectors surrounded by frame "F" in arrangement information 1401 shown in FIG. 17, is different from that projected by another group of the other projectors. In the case shown in FIG. 16, the projectors are divided into two groups. That is, one contains projectors 101 to 103 which each project the image on a white background, and the other contains projectors 104 and 105 which each project the image on a gray background. Here, the projection image on the white background is an example of a first format pattern while the projection image on the gray background is an example of a second format pattern. The images in the first and second format patterns are projected in accordance with instructions from a pattern projection unit included in controller 305 of PC 300 for adjustment.

Returning to FIG. 17, it is possible to change the charge-of-shoot region indicated by frame "F" in projector arrangement information 1401, in the following manner. Consider the camera designated by the top one of radio buttons 1404 and intended to shoot the projection images projected on the left side, in the embodiment. Such a camera is set as follows: The initial values of the charge-of-shoot region covered by the camera involve row numbers 1 to 3; frame "F" surrounds row numbers 1 to 3; and the color of background of row number 3 is different from that of the other row numbers. The charge-of-shoot region can be changed by changing which of the areas displays the row number on such a different background color. For example, in the case where there exists an obstacle and the like, the cameras have to be arranged for circumventing the obstacle, as follows: That is, the camera for shooting the left side covers the charge-of-shoot region involving row numbers 1 to 2, while the camera for shooting the left side covers the charge-of-shoot region involving row numbers 2 to 5. Therefore, this case requires that the initial values of the charge-of-shoot region covered by the camera considered be changed from row numbers 1 to 3 to row numbers 1 to 2. Specifically, the area of row number 2 in projector arrangement information 1401 is clicked, which causes the region surrounded by frame "F" to change into row numbers 1 to 2 and causes the background of row number 2 to change into a color different from that of the other backgrounds.

Moreover, the user can replace the camera that is currently designated by radio button 1404. As shown in FIG. 17, list box 1405 is displayed on the right side of radio button 1404, and "Test Shot" button 1406 is displayed on the right side of the list box. When upper "Test Shot" button 1406 corresponding to radio button 1404 being currently selected is pressed, a shooting instruction is given to the camera corresponding to "Camera 1" set by the initial value. The resulting shot-data are displayed on check screen 1407 positioned below. In this case, "Camera 1" corresponds to camera 202 disposed on the right side; therefore, there are displayed the data which are obtained by shooting the projection images projected by the projectors corresponding to row numbers 3 to 5. Thus, the user can compare row numbers 1 to 3 surrounded by frame "F" in projector arrangement information 1401 with the shot-image displayed on check screen 1407. The comparison allows the user to check to see whether the camera set by the initial value agrees with the actual camera arrangement. In the embodiment, as shown in FIG. 17, the shot-image displayed on check screen 1407 shows row numbers 3 to 5 which are different from row numbers 1 to 3 surrounded by frame "F." This means that the camera corresponding to top radio button 1404 being currently selected has to be replaced.

In order to replace the camera being currently set, the user presses list box 1405, which is currently displaying "Camera 1," to offer a pull-down menu, and then selects "Camera 2" from the menu. Upon selection, the data of arrangement information of the camera corresponding to "Camera 1" change places with those corresponding to "Camera 2." In this state, when the user presses upper "Test Shot" button 1406 once again, the data shot with camera 201 corresponding to "Camera 2" are displayed on check screen 1407 positioned below, as shown in FIG. 18. Camera 201 is shooting row numbers 1 to 3 that are projected on screen 400 by the projectors 101 to 103 as shown in FIG. 16; therefore, the shot-image of row numbers 1 to 3 is displayed on check screen 1407 as shown in FIG. 18. With this operation, the user can check to see that row numbers 1 to 3 surrounded by frame "F" in projector arrangement information 1401 agree with row numbers 1 to 3 displayed on check screen 1407.

Moreover, FIG. 19 is a view illustrating the state in which lower radio button 1404 is turned ON and lower "Test Shot" button 1406 is pressed. At the timing at which the lower radio button is turned ON, row numbers 3 to 5 in projector arrangement information 1401 are surrounded by frame "F," thereby indicating that the charge-of-shoot region covered by the corresponding camera, i.e. the camera on the right side, involves row numbers 3 to 5. At the same time, PC 300 used for performing the adjustment causes each of the projectors to project the corresponding row number, with the format of the row number being changed. Specifically, each of projectors 103 to 105 corresponding respectively to row numbers 3 to 5, which are involved in the charge-of-shoot region covered by the selected camera, projects the image on a white background (in the first format pattern); and each of the other projectors 101 and 102 projects the image on a light gray background (in the second format pattern). Then, upon pressing lower "Test Shot" button 1406, a shooting instruction is given to camera 202 that corresponds to "Camera 1" displayed in lower list box 1405. The resulting shot-data are displayed on check screen 1407 positioned below. With this operation, the user can check to see that row numbers 3 to 5 surrounded by frame "F" in projector arrangement information 1401 agree with row number 3 to 5 displayed on check screen 1407.

"Restore" button 1402 is a button that is used to read the previous-setting information in the case where an adjustment has previously been carried out. After the charge-of-shoot regions covered by all the cameras have been checked, the user presses "Next" button 1408 to determine their correspondences. In the application, data as shown in FIG. 20 are stored as internal information in storage unit 303. That is, it is stored that the charge-of-shoot region covered by the camera (ID=Camera 2) involves row numbers 1 to 3 (Start Index=1, End Index=3) and the charge-of-shoot region covered by the camera (ID=Camera 1) involves row numbers 3 to 5 (Start Index=3, End Index=5). Here, radio buttons 1404 and list boxes 1405 are an example of an imaging-apparatus selecting unit. Projector arrangement information 1401 is an example of a shooting-region setting unit. Moreover, check screen 1407 is an example of a shot-image display unit.

Figure 21:
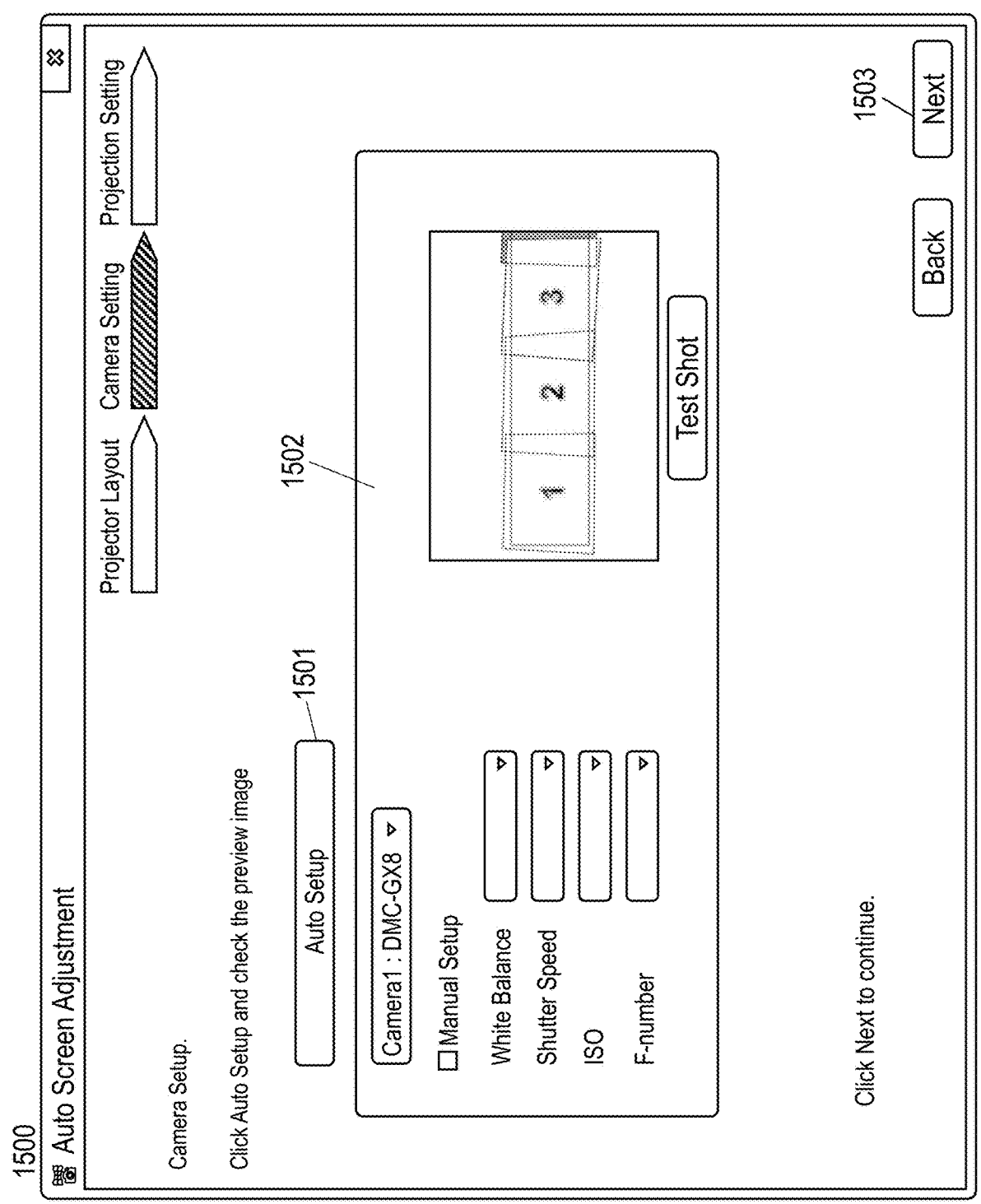
FIG. 21 is a view of an application screen which is used for adjusting the cameras in terms of exposure, white-balance, and focus.

FIG. 21 is a view of application screen 1500 used for adjusting the cameras in terms of exposure, white-balance, and focus. Upon pressing "Auto Setup" button 1501, all the cameras connected are subjected to automatic adjustment. Specifically, all-white patterns are projected by the projectors and the projected patterns are shot by the cameras. Then, parameters of each of the cameras are adjusted in terms of exposure time, International Organization for Standardization (ISO) sensitivity, diaphragm, etc., such that thus-shot images of the patterns are not overexposed. Next, a white-balance is adjusted with the projected all-white pattern as a reference. Finally, a pattern such as a cross-hatch pattern, on which the focus is easily adjusted, is projected to adjust the focus of each of the cameras.

The result from the automated adjustment is displayed in camera-parameter check area 1502. If "Manual Setup" check box is turned ON, it is possible to manually set a desired parameter. After the adjustment has been completed, "Next" button 1503 is pressed to precede the next step.

Figure 22:
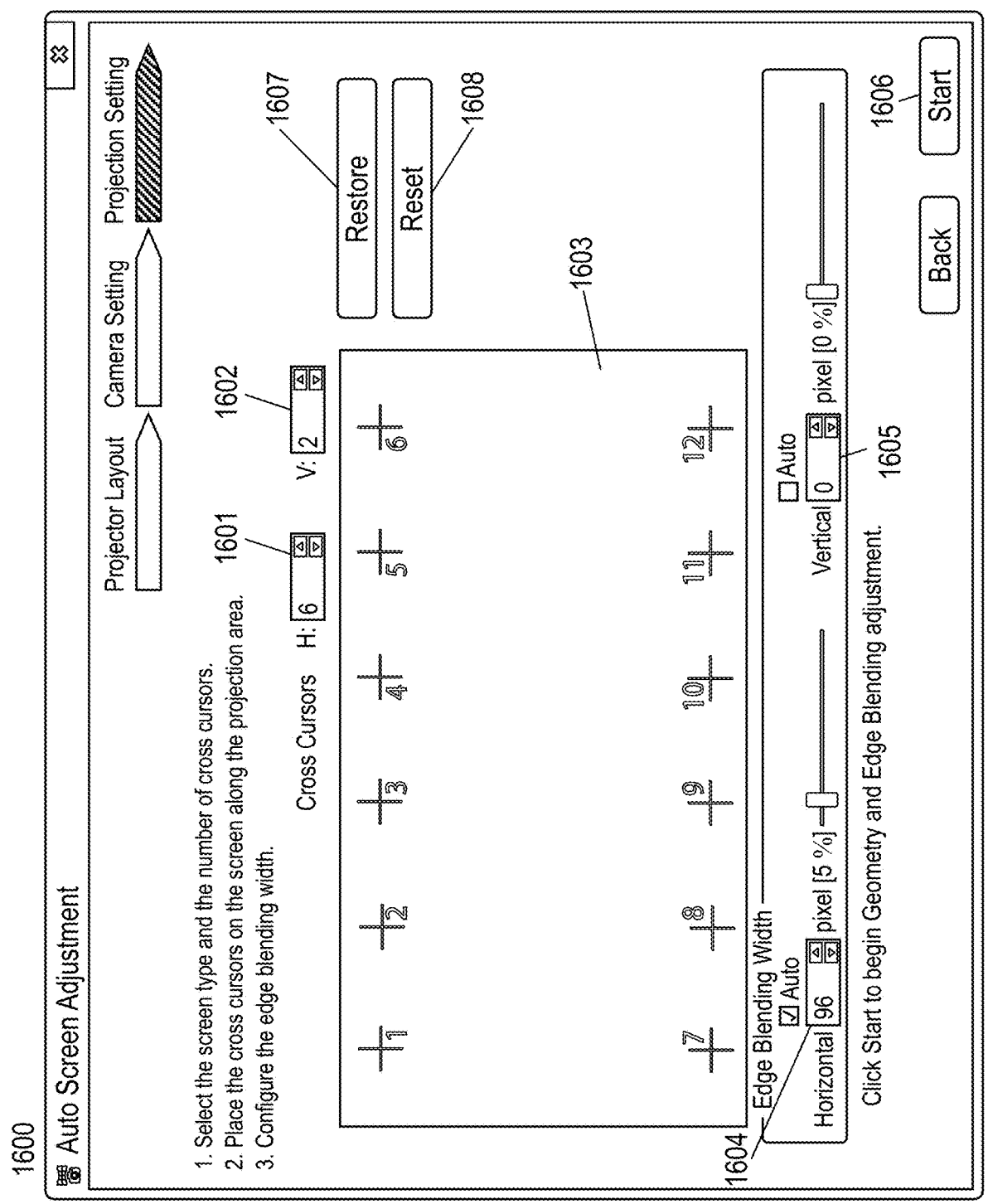
FIG. 22 is a view of an application screen which is used for setting the projection regions and overlap widths.
Figure 23:
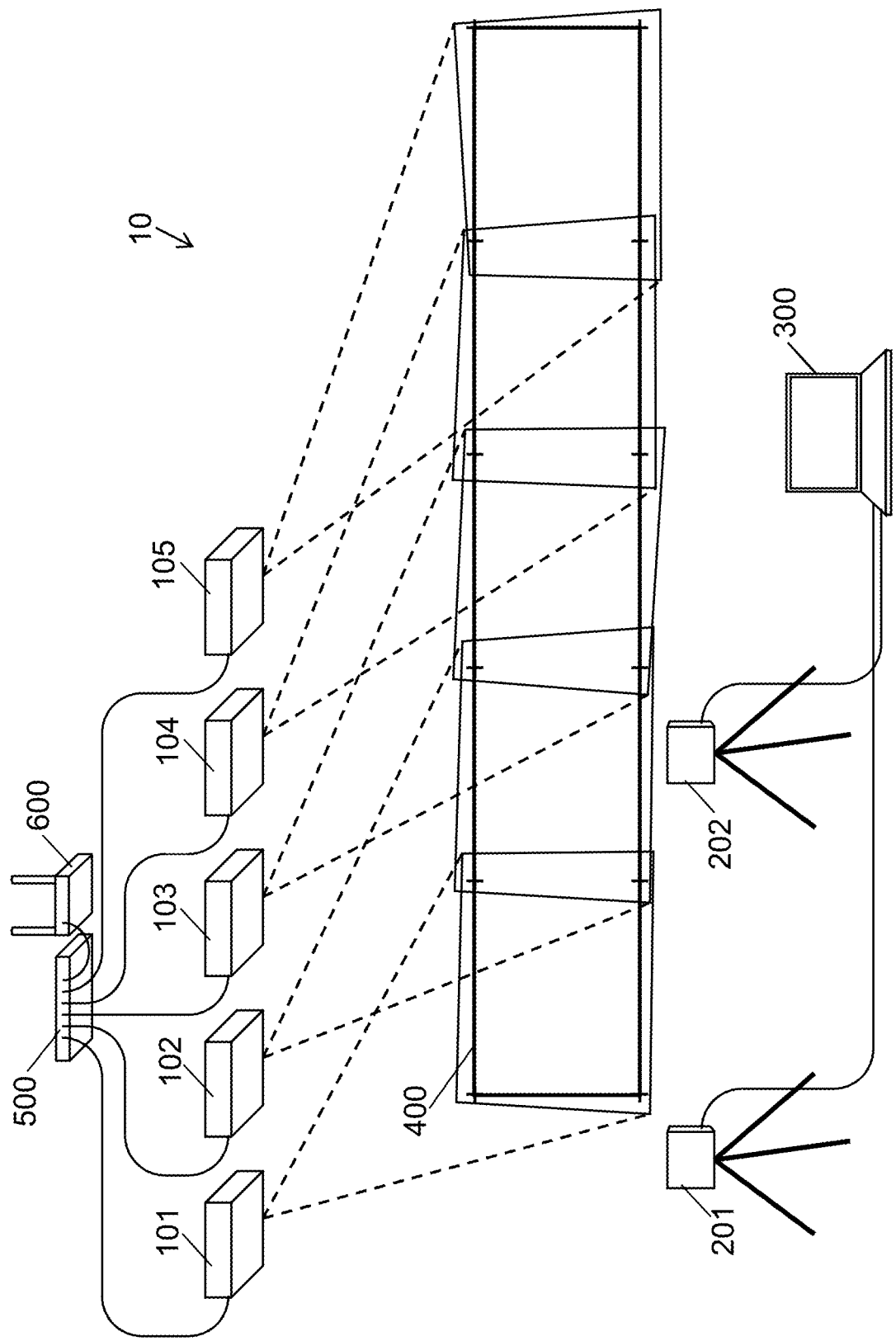
FIG. 23 is a view of an example of the projection by the projectors, during the operation of setting the projection regions.

FIG. 22 is a view of application screen 1600 in Step S500. In the step, the region of screen 400, on which the images are projected, is set; edge-blending widths between the projectors adjacent to each other are set. At the timing of displaying the application screen, each of the projectors projects cursors that are used to indicate the region of the screen (FIG. 23).

The number of the cursors which indicate the region of the screen is determined in such a manner that the numbers in the horizontal and vertical directions are inputted to "Cross Cursors H:" numeral input box 1601 and "Cross Cursors V:" numeral input box 1602, respectively. In the embodiment, the projection on screen 400 is made by using 5 (five) units of projectors 101 to 105 aligned in the horizontal direction; therefore, the screen is specified with 6 (six) cursors in the horizontal direction and 2 (two) cursors in the vertical direction. In cursor selection area 1603, the user selects a cursor which the user wants to move. Then, the user moves the position of the selected cursor by operating a mouse, keyboard, etc. In conjunction with the cursor's motion, the corresponding cursor which is projected on screen 400 by the projector shown in FIG. 23 moves. In this way, the position of each of the cursors can be adjusted such that they surround actual screen 400 at regular intervals.

Next, returning to FIG. 22, the edge-blending widths between the projectors are specified. To "Horizontal" numeral input box 1604, a width is inputted in which edge-blending is made on a pixel unit basis, with the width being set at each of left-right overlapping portions between the projection regions when the projectors are aligned in the horizontal direction. Likewise, to "Vertical" numeral input box 1605, a width is inputted in which edge-blending is made on a pixel unit basis, with the width being set at each of up-down overlapping portions between the projection regions when the projectors are aligned in the vertical direction. A slider bar positioned next to and on the right of each of the numeral input boxes can be used to change the numerals. Instead of this, "Auto" check box positioned over each of the numeral input boxes can also be used to perform automatic computation such that the application computes the appropriate widths automatically.

Figure 24:
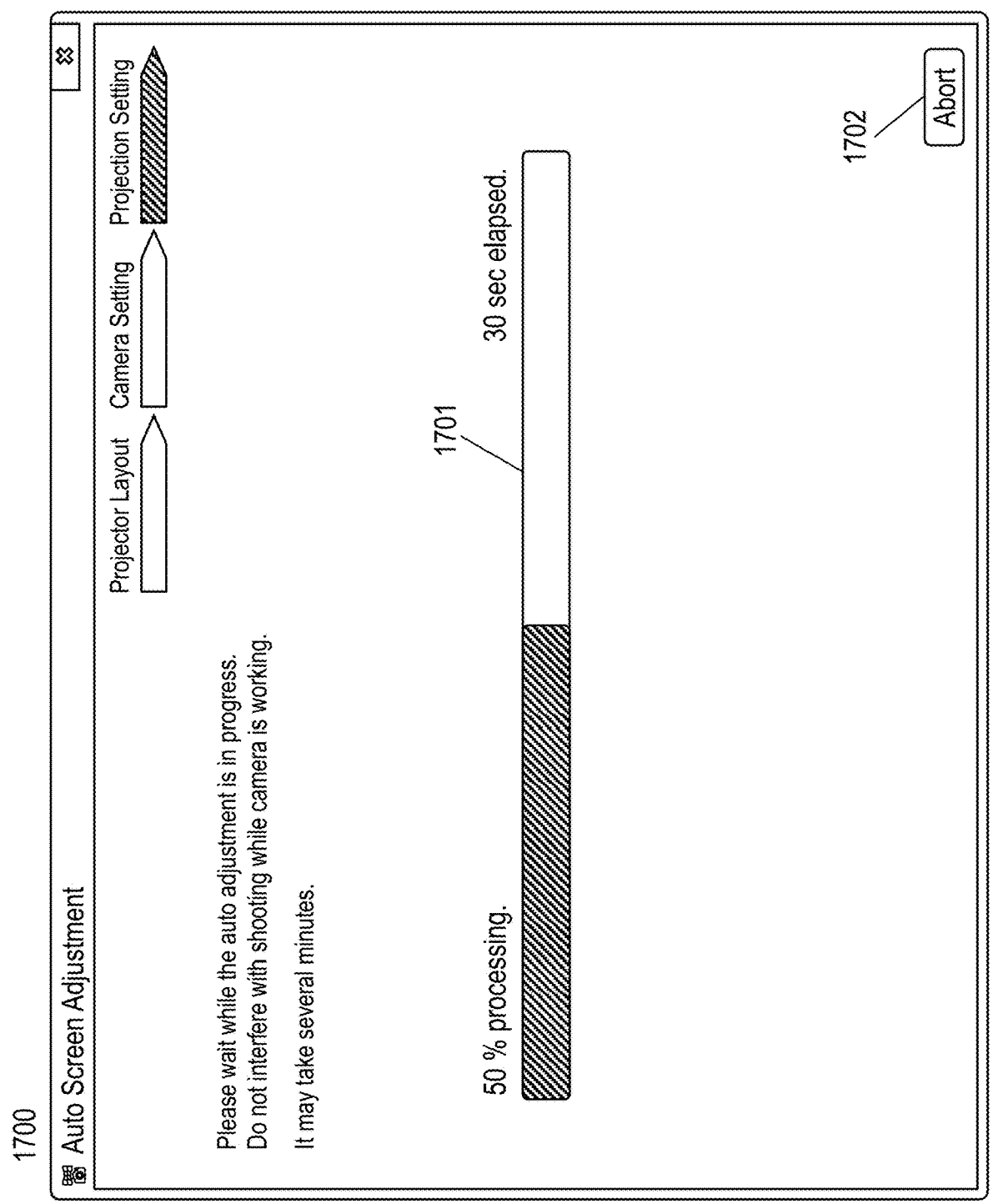
FIG. 24 is a view of an application screen that shows a progress status in an automatic execution phase.

"Restore" button 1607 is a button that is used to read previous-setting information in the case where an adjustment has previously been carried out, with the information including the number of the cursors, positions of the cursors, and edge-blending widths which all have been determined in the adjustment. Moreover, "Restart" button 1608 is used to return the values of positions of the cursors and the edge-blending widths, back to the initial ones. After all the settings have been completed, "Start" button 1606 is pressed to cause the operation to shift into the automatic execution phase (S600 to S1000). During the automatic execution, application screen 1700 including progress bar 1701 as shown in FIG. 24 is displayed to give the user notice of the current status of the automatic execution. If "Abort" button 1702 is pressed, the execution is aborted.

1-3. Advantages and Others

As described above, in the embodiment, the projection image adjustment system includes: the plurality of projectors 101 to 105, the plurality of cameras 201 and 202, PC 300 used for performing adjustment, and screen 400. Each of the plurality of cameras 201 and 202 shoots pattern images that are projected by the projectors which the camera covers. PC 300 for adjustment selects one from the plurality of the cameras and sets a projection region of the projectors covered by the selected camera. Upon setting the projection region, the projectors involved in the thus-set projection region projects the images in the first format pattern, while projectors not involved in the thus-set projection region projects the images in the second format pattern. Then, PC 300 for adjustment displays image data that are shot with the selected camera.

With this configuration, the user can easily check to see whether or not the charge-of-shoot region covered by the selected camera includes the projection region of the projectors designated. If the charge-of-shoot region does not include the projection region, the user can easily perform the operation of changing the positions of the cameras, the selection, the projection region of the projectors, and the like.

OTHER EXEMPLARY EMBODIMENTS

In the embodiment described above, as shown in FIG. 16, the two kinds of format patterns are used. That is, the projection image on the white background is in the first format pattern while the projection image on the light gray background is in the second format pattern. Instead of this, the projection images may be as follows: It is images on the white background, serving as only one format pattern, that are allowed to be projected on a part of the screen, with no other images being projected on the remaining part that configures a non-projection region of the screen. In this case, camera 201 shoots the projection images of row numbers 1 to 3, while camera 202 shoots the projection image of row number 3 and the non-projection region of the screen. Even with this configuration, the user can find which of the cameras covers to shoot which of the projection regions.

In the embodiment described above, as shown in FIG. 1, the descriptions have been made regarding the projection image adjustment system in which the projection images projected by 5 units of the projectors are shot with 2 units of the cameras. The numbers of the projectors and cameras are not limited to this. For example, the projection image adjustment system may be configured such that projection images projected by 7 units of projectors which are aligned in a horizontal row are shot with 3 units of cameras. In this case, the charge-of-shoot region covered by the cameras can be divided into 3 projector groups consisting of: a group of row numbers 1 to 3, a group of row numbers 3 to 5, and a group of row numbers 5 to 7. Radio buttons 1404, list boxes 1405, "Test Shot" buttons 1406, which are shown in FIG. 17, are then displayed in three tiers. When the camera in the top tier is set, row numbers 1 to 3 displayed in projector arrangement information 1401 are surrounded by frame "F," and each of the projectors corresponding to row numbers 1 to 3 projects an image in a first format pattern on the screen. In the same way, when the camera in the middle tier is set, row numbers 3 to 5 are surrounded by frame "F," and each of the projectors corresponding to the row numbers projects an image in the first format pattern on the screen. Likewise, when the camera in the bottom tier is set, row numbers 5 to 7 are surrounded by frame "F," and each of the projectors corresponding to the row numbers projects an image in the first format pattern on the screen.

As described above, the exemplary embodiments have been described to exemplify the technology according to the present disclosure. To that end, the accompanying drawings and the detailed descriptions have been provided.

Therefore, the constituent elements described in the accompanying drawings and the detailed descriptions may include not only essential elements for solving the problems, but also inessential ones for solving the problems which are described only for the exemplification of the technology described above. For this reason, it should not be acknowledged that these inessential elements are considered to be essential only on the grounds that these inessential elements are described in the accompanying drawings and/or the detailed descriptions.

Moreover, because the aforementioned embodiments are used only for the exemplification of the technology disclosed herein, it is to be understood that various changes and modifications, replacements, additions, omissions, and the like may be made to the embodiments without departing from the scope of the appended claims or the scope of their equivalents.

INDUSTRIAL APPLICABILITY

The technology according to the present disclosure is applicable to image display through use of projection display apparatuses.

What is claimed is:

1. A projection image adjustment system, comprising: a plurality of projectors including a first projector, a second projector and a third projector, each of the first, second and third projectors configured to project a first projection image, a second projection image and a third projection image, respectively, on a projection screen, each of the first projector, the second projector and the third projector are distinct from each other; a first camera configured to capture a plurality of first projection images projected on the projection screen, the plurality of first projection images including at least the first projection image; a second camera configured to capture a plurality of second projection images projected on the projection screen, the plurality of second projection images including at least the third projection image which is not included in the plurality of first projection images captured by the first camera; a display unit configured to display an image captured by the first camera or the second camera; and a controller configured to control the plurality of projectors, the first camera, and the second camera, wherein the controller is further configured to: accept a selection of one of the first camera and the second camera as a selected camera; set a first charge-of-shoot region and a second charge-of-shoot region, the first camera being in charge of shooting the first charge-of-shoot region including the first projection image being projected by the first projector and the second projection image being projected by the second projector, the second camera being in charge of shooting the second charge-of-shoot region including the second projection image being projected by the second projector and the third projection image being projected by the third projector; project a first format pattern by using the plurality of projectors that project the plurality of the first or the second projection images captured by the selected camera; display on a display unit an image of the first charge-of-shoot region or an image of the second charge-of-shoot region, captured by the selected cameras, select a camera layout for the first camera and the second camera based on a layout configuration of the first projector, the second projector and the third projector, and set the first charge-of-shoot region and the second charge-of-shoot region based on the camera layout, and computes geometric correction data and transmits the geometric correction data to the plurality of projectors.

2. The projection image adjustment system according to claim 1, wherein the controller is further configured to project a second format pattern different from the first format pattern by using at least one of the plurality of projectors adjacent to a projector that projects the first format pattern.

3. A method performed by a processor, the method of adjusting projection images projected on a projection screen by a plurality of projectors including a first projector, a second projector and a third projector, each of the first projector, the second projector and the third projector are distinct from each other, a projection image of the projection images being captured by a first camera to provide a first captured image, a projection image of the projection images being captured by a second camera to provide a second captured image, the second captured image includes at least a portion which is different from the first captured image, the projection images being adjusted based on the first or second captured images, the method comprising steps of: selecting one of the first camera and the second camera as a selected camera; setting a first charge-of-shoot region and a second charge-of-shoot region, the first camera being in charge of shooting the first charge-of-shoot region including the first captured image and the second captured image, the second camera being in charge of shooting the second charge-of-shoot region including the second captured image and a third captured image, the third captured image based on an image projected by the third projector; projecting a first format pattern by using the plurality of projectors that project the first or second captured image captured by the selected camera; displaying an image captured by the selected camera, selecting a camera layout for the first camera and the second camera based on a layout configuration of the first projector, the second projector and the third projector, and setting the first charge-of-shoot region and the second charge-of-shoot region based on the camera layout, and computing geometric correction data and transmitting the geometric correction data to the plurality of projectors.

4. The method of adjusting the image according to claim 3, wherein, in the step of projecting, a second format pattern different from the first format pattern is projected by at least one of the plurality of projectors adjacent to a projector that projects the first format pattern.

5. The projection image adjustment system according to claim 1, wherein the plurality of second projection images further includes at least one image which is the same as the plurality of first projection images captured by the first camera.

6. The method of adjusting the image according to claim 3, wherein the second captured image further includes at least a portion which is the same as the first captured image.

7. The projection image adjustment system according to claim 1, wherein the controller is further configured to display a mark which represents a projection region of one of the first camera and the second camera indicating a set shoot region as a current charge-of-shoot region.

8. The method of adjusting the image according to claim 3, wherein the method further comprising a step of displaying a mark which represents projection region of one of the first camera and the second camera indicating a set shoot region as a current charge-of-shoot region.

9. The projection image adjustment system according to claim 7, wherein the controller is further configured to accept an instruction by a user for changing a position of the mark on the display unit.

10. The method of adjusting the image according to claim 8, wherein the method further comprises a step of accepting an instruction by a user for changing a position of the mark.

11. The projection image adjustment system according to claim 1, wherein the second projection image is projected between the first projection image and the third projection image.

* * * * *